(12) United States Patent  (10) Patent No.: US 8,661,274 B2
Hansquine et al.  (45) Date of Patent: Feb. 25, 2014

(54) TEMPERATURE COMPENSATING ADAPTIVE VOLTAGE SCALERS (AVSS), SYSTEMS, AND METHODS

(75) Inventors: David W. Hansquine, Raleigh, NC (US); Richard Gerard Hofmann, Raleigh, NC (US); Richard Alan Moore, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 430 days.

(21) Appl. No.: 12/701,657

(22) Filed: Feb. 8, 2010

(65) Prior Publication Data

US 2011/0004774 A1  Jan. 6, 2011

Related U.S. Application Data

(60) Provisional application No. 61/222,752, filed on Jul. 2, 2009.

(51) Int. Cl.
*G06F 1/04* (2006.01)
*G06F 1/26* (2006.01)

(52) U.S. Cl.
USPC .......................... 713/310; 713/300; 713/401

(58) Field of Classification Search
None
See application file for complete search history.

(56) References Cited

U.S. PATENT DOCUMENTS

| | | | |
|---|---|---|---|
| 6,157,247 A * | 12/2000 | Abdesselem et al. | 327/540 |
| 7,289,921 B1 | 10/2007 | Salmi et al. | |
| 2004/0183588 A1* | 9/2004 | Chandrakasan et al. | 327/545 |
| 2005/0218871 A1* | 10/2005 | Kang et al. | 323/265 |
| 2007/0096775 A1 | 5/2007 | Elgebaly et al. | |
| 2008/0106327 A1* | 5/2008 | Meijer et al. | 327/540 |
| 2011/0080202 A1* | 4/2011 | Moore et al. | 327/276 |

FOREIGN PATENT DOCUMENTS

| | | |
|---|---|---|
| CN | 1983119 A | 6/2007 |
| EP | 1008923 A1 | 6/2000 |
| JP | 11085723 | 3/1999 |
| JP | 2001505676 A | 4/2001 |
| JP | 2003150283 A | 5/2003 |
| JP | 2005533296 A | 11/2005 |
| JP | 2007096775 A | 4/2007 |

(Continued)

OTHER PUBLICATIONS

International Search Report and Written Opinion—PCT/US2010/040946—International Search Authority, European Patent Office,Oct. 11, 2010.

*Primary Examiner* — Dennis M Butler
(74) *Attorney, Agent, or Firm* — Peter Michael Kamarchik; Nicholas J. Pauley; Joseph Agusta

(57) ABSTRACT

Adaptive voltage scalers (AVSs), systems, and related methods are disclosed. The AVSs are configured to adaptively adjust voltage levels powering a functional circuit(s) based on target operating frequencies and delay variation conditions to avoid or reduce voltage margin. In one embodiment, the AVS includes a database. The database can be configured to store voltage levels for various operating frequencies of a functional circuit(s) to avoid or reduce voltage margin. The database allows rapid voltage level decisions. In one embodiment, a voltage offset is added to a voltage level retrieved from the database corresponding to a target operating frequency of the functional circuit(s). In another embodiment, a voltage level is retrieved from the database corresponding to a target operating frequency for and a temperature level of the functional circuit(s). The AVS may partially or fully controllable by a software-based module that consults the database to make voltage level decisions.

34 Claims, 18 Drawing Sheets

(56) References Cited

FOREIGN PATENT DOCUMENTS

| WO | WO9806022 | 2/1998 |
| WO | 9813742 A1 | 4/1998 |
| WO | 03036448 A2 | 5/2003 |
| WO | WO2005125012 A1 | 12/2005 |
| WO | WO2006073845 | 7/2006 |

* cited by examiner

AVS Frequency / Voltage Level Table (50)

| f | V | |
|---|---|---|
| $f_1$ | 1.32 | ← 52 |
| $f_2$ | 1.2 | |
| $f_3$ | 1.0 | |
| ⋮ | ⋮ | |
| $f_N$ | 0.85 | |

AVS Learned Values Table (100)

| f (106) | V (104) | Learned (102) |
|---------|---------|---------------|
| $f_1$   | 1.2     | 1             | ←108
| $f_2$   | 1.0     | 1             |
| $f_3$   | 0.9     | 0             |
| ⋮       |         |               |
| $f_N$   | 0.85    | 1             |

AVS Frequency/Voltage Level Table (140)

| | T (°C) | | $f_1$ | $f_2$ | ... | $f_N$ |
|---|---|---|---|---|---|---|
| $B_1$ → | 80 | 60 | 1.2V | 1.18V | ... | |
| $B_2$ → | 60 | 40 | 1.1V | 1.08V | ... | |
| $B_3$ → | 40 | 20 | 1.0V | .99V | ... | |
| $B_4$ → | 20 | 0 | ⋮ | ⋮ | ... | ⋮ |
| $B_N$ → | ⋮ | ⋮ | .95V | .94V | ... | |

142 points to the header row; 144 points to the data area.

Minimum Voltage Level Limit Table (190)

| f | V |
|---|---|
| $f_1$ | 0.85 |
| $f_2$ | 0.85 |
| $f_3$ | 0.95 |
| ⋮ | ⋮ |
| $f_N$ | 0.85 |

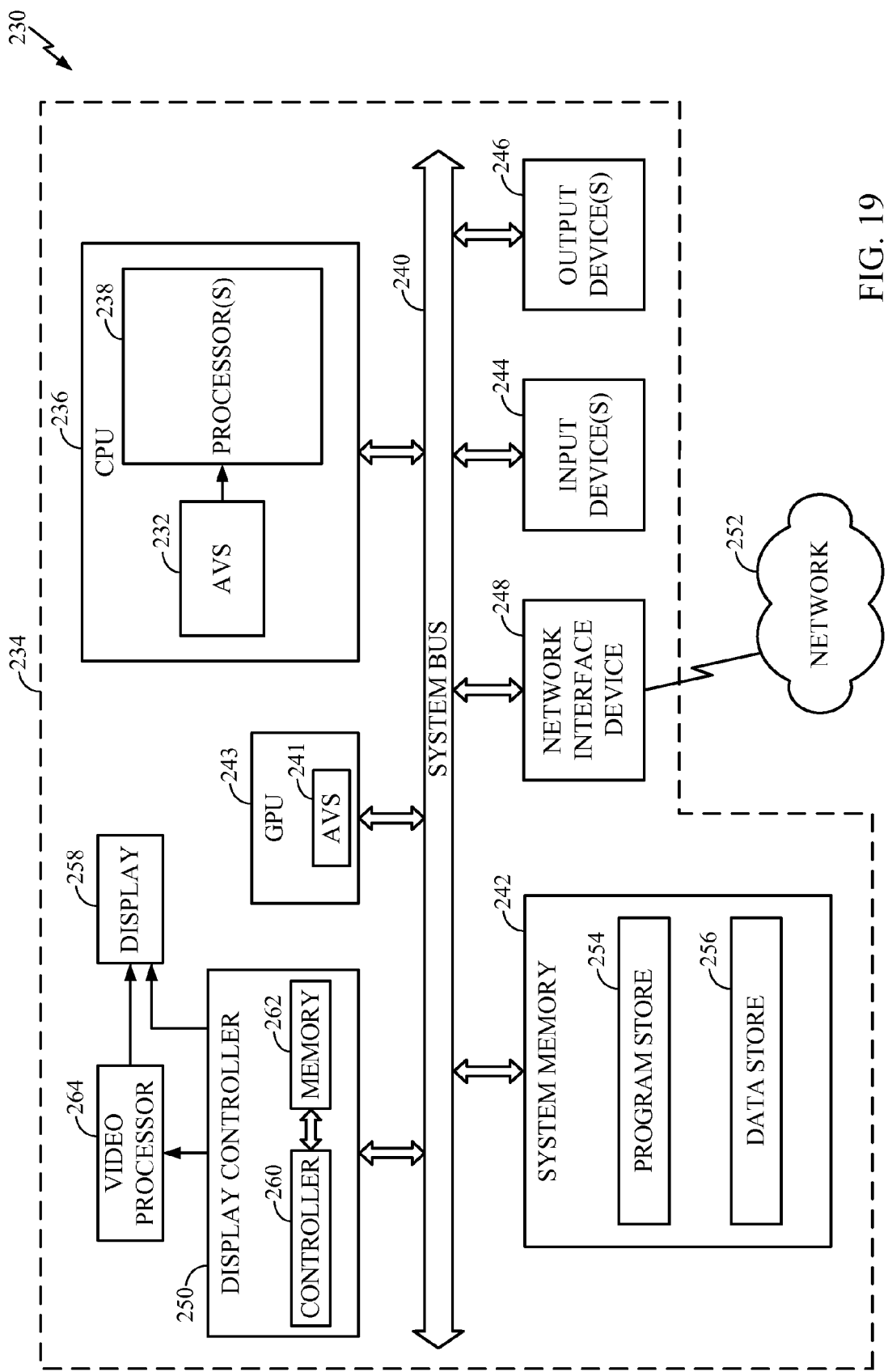

TEMPERATURE COMPENSATING ADAPTIVE VOLTAGE SCALERS (AVSS), SYSTEMS, AND METHODS

RELATED APPLICATION

The present application claims priority to U.S. Provisional Patent Application Ser. No. 61/222,752 entitled "TEMPERATURE COMPENSATING ADAPTIVE VOLTAGE SCALERS (AVSs), SYSTEMS, AND METHODS" filed on Jul. 2, 2009, which is incorporated herein by reference in its entirety.

BACKGROUND

I. Field of the Disclosure

The technology of the disclosure relates to temperature compensating adaptive voltage scalers (AVSs), systems, and methods for optimizing power consumption in a functional circuit(s).

II. Background

Synchronous digital circuits, such as central processing units (CPUs) or digital signal processors (DSPs) for example, require a clock signal to coordinate timing of logic in the circuit. The frequency of the clock signal controls the switching speed or rate of the logic and thus the performance of the circuit. There is a relationship between operating frequency and the voltage level powering a circuit. An increase in operating frequency increases the minimum voltage level required to power the circuit for proper operation. Thus, an increase in operating frequency generally results in more power consumption. Power consumption can be decreased by lowering the voltage level. However, a decrease in voltage level decreases the maximum operating frequency possible for the circuit. The voltage level can be decreased until a minimum threshold voltage level for the circuit necessary for proper operation is reached.

While it is generally desired to maximize performance of a circuit by maximizing the operating frequency, there may be times when maximizing the operating frequency is not required or desired. In this instance, the voltage level powering the circuit could be reduced to conserve power. In this regard, a dynamic voltage scaler (DVS) can be employed. The DVS can control a clock generator to produce a clock signal for the circuit at a desired operating frequency. The DVS can adjust the voltage to a minimum voltage level at a given operating frequency to conserve power while maintaining proper circuit operation.

Other factors can raise the minimum voltage level required to power a circuit at a given operating frequency. For example, variability in nanometer integrated circuit (IC) processes used to manufacture synchronous digital circuits and their components can cause delay variations. Environmental conditions, such as operating temperature and aging effect of transistors, can affect propagation delay. Voltage levels supplied by voltage supplies can be momentarily lowered due to variations in current draw, thus momentarily lowering performance. In this regard, a DVS may be configured to control the minimum voltage level for the circuit according to worst case delay scenarios to ensure proper circuit operation, when in actuality, worst case delay scenarios are not present at all times. When worst case delay scenarios are not present, the voltage level could be lowered and the circuit operates properly. The difference between the worst case minimum voltage level and the actual minimum voltage level required to power a circuit for a given operating frequency at a given time is known as voltage or power margin. Voltage margin represents consumed power that did not have to be consumed for a circuit to properly operate at a given operating frequency.

SUMMARY OF THE DISCLOSURE

Embodiments disclosed in the detailed description include adaptive voltage scalers (AVSs), AVS systems, and related circuits and methods. The AVSs and AVS systems, circuits, and methods are configured to adaptively adjust the voltage level powering a functional circuit(s) based on a target operating frequency and delay variation conditions to avoid or reduce voltage margin. Avoiding or reducing voltage margin can conserve power while maintaining proper functional circuit(s) operation. Delay variations can include one or more manufacturing variations specific to each AVS and functional circuit(s) and/or operational variations caused by variations in environmental conditions. Delay variation conditions can shift the relationship between operating frequency and minimum voltage level necessary for proper operation of the functional circuit(s). The functional circuit(s) may be a synchronous digital circuit(s) as an example. The AVS may also be included as an additional voltage scaler to a dynamic voltage scaler (DVS) to set the operating frequency and voltage level for a functional circuit(s).

In one embodiment, the AVS comprises at least one delay circuit configured to receive an input signal. The AVS delays the input signal by a delay amount relating to at least one delay path of a functional circuit to produce a delay output signal. The AVS is responsive to the delay output signal. The AVS is also coupled to a database (or AVS database). The database can be configured to store voltage levels for various operating frequencies of a functional circuit(s) to avoid or reduce voltage margin. The stored voltage levels are based on voltage levels to properly operate the functional circuit(s) at a given operating frequency accounting for other delay variation conditions in the functional circuit(s). The AVS is configured to generate a voltage level setting signal based on delay information in the delay output signal and a voltage offset added to a voltage level stored in the database associated with a target operating frequency for the functional circuit(s). In this manner, the functional circuit is operated at an increased voltage level over the voltage level previously stored in the database for the target operating frequency. The voltage level previously stored in the database may have been sufficient under previous conditions of the functional circuit(s), but may not longer be sufficient under current conditions. The AVS can subsequently lower the voltage level, if possible, during operation while maintaining proper operation of the functional circuit(s). The AVS may generate the voltage level setting signal in response to an indication that a new operating frequency should be provided to the functional circuit(s), or a change in temperature level.

In another embodiment, the AVS comprises at least one delay circuit configured to receive an input signal. The AVS delays the input signal by a delay amount relating to at least one delay path of a functional circuit to produce a delay output signal. The AVS is responsive to the delay output signal. The AVS is also coupled to a database (or AVS database). The database can be configured to store voltage levels for various operating frequencies of a functional circuit(s) to avoid or reduce voltage margin. The stored voltage levels are based on voltage levels to properly operate the functional circuit(s) at a given operating frequency accounting for other delay variation conditions in the functional circuit(s). The AVS is configured to generate a voltage level setting signal based on a voltage level stored in the database associated with an operating frequency for and temperature level of the functional circuit(s) and delay information in the delay output signal. The AVS may receive a temperature level from a temperature sensor coupled to the AVS. In this manner, the voltage level provided to the functional circuit(s) accounts for variations in both operating frequency and temperature level while avoiding or reducing voltage margin.

The database provides flexibility in allowing the configuration and/or changing of parameters used by the AVS to make voltage level decisions. The database may be provided in non-volatile memory so that stored voltage levels are retained over power cycles. The AVS may be partially or fully controllable by software executing in the circuit. The AVS may include a software-based module that executes software instructions to consult the database and make voltage level decisions. Providing the AVS as a software-based module allows flexibility in configuring the AVS. For example, variations in manufacturing processes of the AVS and/or functional circuit(s) may shift the minimum voltage level for proper operation of the functional circuit(s) for a given operating frequency. The AVS and/or the database may need to be configured or reconfigured after manufacture based on these variations.

In another embodiment, a method of scaling a voltage level for a functional circuit is provided. The method comprises receiving an input signal in at least one delay circuit. The method further comprises delaying the input signal by a delay amount relating to at least one delay path of a functional circuit to produce a delay output signal, and generating a voltage level setting signal based on a voltage offset added to a voltage level stored in the database associated with an operating frequency for the functional circuit(s) and delay information in the delay output signal.

In another embodiment, a method of scaling a voltage level for a functional circuit is provided. The method comprises receiving an input signal in at least one delay circuit. The method further comprises delaying the input signal by a delay amount relating to at least one delay path of a functional circuit to produce a delay output signal, and generating a voltage level setting signal based on a voltage level stored in the database associated with an operating frequency for and temperature level of the functional circuit(s) and delay information in the delay output signal.

In another embodiment, a computer readable medium having stored thereon computer executable instructions is provided. The instructions are provided to cause an AVS module to generate a voltage level setting signal based on a voltage offset added to a voltage level stored in the database associated with an operating frequency for the functional circuit(s) and delay information in a delay output signal representing a delay amount relating to at least one delay path of the functional circuit.

In another embodiment, a computer readable medium having stored thereon computer executable instructions is provided. The instructions are provided to cause an AVS module to generate a voltage level setting signal on a voltage level stored in the database associated with an operating frequency for and temperature level of the functional circuit(s) and delay information in a delay output signal representing a delay amount relating to at least one delay path of the functional circuit.

BRIEF DESCRIPTION OF THE FIGURES

FIG. 2 is an exemplary AVS frequency/voltage level table stored in an AVS database;

FIG. 8 is an exemplary AVS learned values table that may be included in an AVS database to store learned voltage levels for operating frequencies explored by an AVS;

FIG. 13 is an exemplary AVS frequency/voltage level table providing voltage level values as a function of operating frequencies and temperature level bands of a functional circuit(s);

FIG. 17 is an exemplary minimum voltage level limit table providing minimum voltage levels corresponding to different operating frequencies of a functional circuit(s);

FIG. 19 is a block diagram of an exemplary central processing unit (CPU) functional circuit and related system employing an AVS.

DETAILED DESCRIPTION

Figure 1:
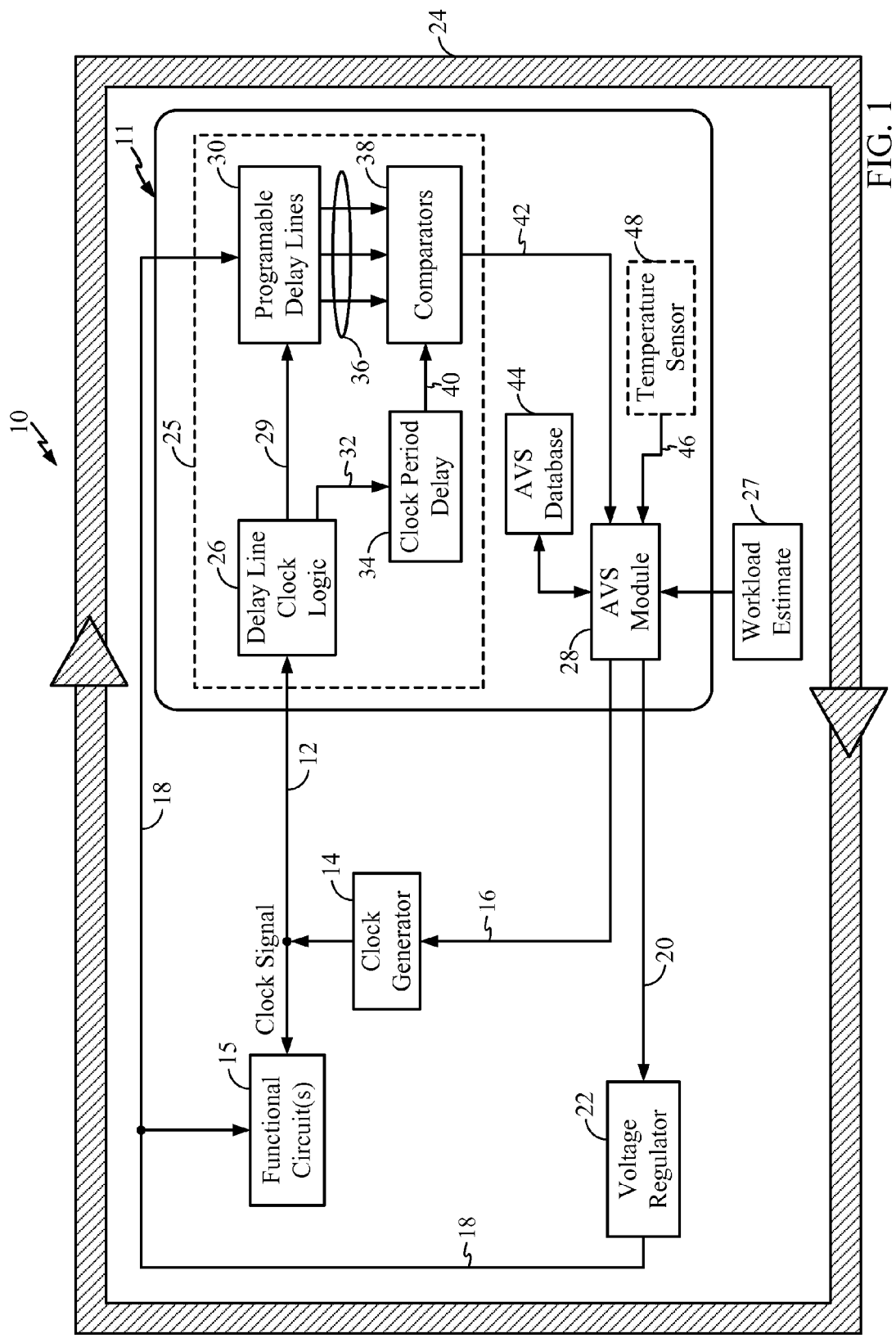
FIG. 1 is a schematic diagram of an exemplary adaptive voltage scaler (AVS), AVS system and functional circuit(s)

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

Embodiments disclosed in the detailed description include adaptive voltage scalers (AVSs), AVS systems, and related circuits and methods. The AVSs and AVS systems, circuits, and methods are configured to adaptively adjust the voltage level powering a functional circuit(s) based on a target operating frequency and delay variation conditions to avoid or reduce voltage margin. Avoiding or reducing voltage margin can conserve power while maintaining proper operation of the functional circuit(s). Delay variations can include one or more manufacturing variations specific to each AVS and functional circuit(s) and/or operational variations caused by variations in environmental conditions. Delay variation conditions can shift the relationship between operating frequency and minimum voltage level necessary for proper operation of the functional circuit(s). The functional circuit(s) may be a synchronous digital circuit(s) as an example. The AVS may also be included as an additional voltage scaler to a dynamic voltage scaler (DVS) to set the operating frequency and voltage level for a functional circuit(s).

In this regard, an exemplary adaptive voltage scaler (AVS) system 10 is schematically illustrated in FIG. 1. The AVS system 10 includes an AVS 11 that is configured to determine and set an operating frequency of a clock signal 12 generated by a clock generator 14 for controlling the switching speed or rate of the logic in a functional circuit(s) 15. The AVS 11 may be provided in a circuit. The functional circuit(s) 15 may be a synchronous digital circuit, as an example. The AVS 11 generates an operating frequency setting signal 16 as an input into the clock generator 14 to control the operating frequency of the clock signal 12. The clock generator 14 may provide a conventional clock signal, a glitch free clock signal, or any other type of clock signal desired.

The AVS 11 also controls a voltage level of a voltage signal 18 provided to the functional circuit(s) 15 to power the functional circuit(s) 15. The AVS 11 generates a voltage level setting signal 20 as an input into a voltage regulator 22 to control the voltage level of the voltage signal 18. The voltage level is determined based on the operating frequency determined by the AVS 11 and delay variation conditions. There is a relationship between the operating frequency of the functional circuit(s) 15 and the minimum voltage level to power the functional circuit(s) 15 for proper operation. An increase in operating frequency may increase the minimum voltage level to power the functional circuit(s) 15 for proper operation. A decrease in operating frequency may decrease the minimum voltage level to power the functional circuit(s) 15 for proper operation, at least until a minimum threshold voltage necessary to power the functional circuit(s) 15 is reached.

With continuing reference to FIG. 1, the AVS 11 adaptively determines the operating frequency and voltage level for the functional circuit(s) 15 repeatedly over time, either periodically or a periodically, in a tuning loop 24. The operating frequency setting signal 16 is adaptively controlled to avoid or reduce performance margin of the functional circuit(s) 15 while maintaining proper operation. The voltage level setting signal 20 is also adaptively controlled to avoid or reduce voltage margin to conserve power for the functional circuit(s) 15 while maintaining the target operating frequency. The voltage signal 18 is produced by the voltage regulator 22 according to the voltage level setting signal 20 generated by an AVS module 28 in the AVS 11. The AVS module 28 can be a circuit and can be provided as hardware, software, or a combination thereof. The AVS 11 generates the operating frequency setting signal 16 and voltage level setting signal 20 in response to workload estimate 27 providing a target operating frequency.

One or more delay circuits 25 are provided in the AVS 11 to produce a delay based on delay variation conditions provided in the functional circuit(s) 15. Delays in the functional circuit(s) 15 can vary due to variations in the manufacturing process and/or operating conditions. The delay circuit 25 includes delay line clock logic 26 that receives as an input signal the clock signal 12 generated by the clock generator 14 as part of the tuning loop 24. The delay line clock logic 26 generates an output signal 29 representing a delay of the clock signal 12 into delay lines 30 and an output signal 32 representing a delay of the clock signal 12 into a clock period delay 34. The delay lines 30 have a plurality of delay paths (not shown) configured to correspond to one or more selected delay paths in the functional circuit(s) 15. The selected delay paths have associated delays that are configured to simulate and adjust in the same or similar manner to selected delay paths in the functional circuit(s) 15 based on delay variation conditions during operation. For example, the delay paths may include gate-dominated, wire-dominated, and/or diffusion capacitance-dominated delay paths, wherein one of the delay paths will produce the greater delay depending on present operating conditions of the functional circuit(s) 15. The selected delay paths may also correspond to one or more critical paths in the functional circuit(s) 15. The delay lines 30 may be programmable to allow the selected delay paths therein to be tuned to the specific functional circuit(s) 15 coupled to the AVS 11.

The delay lines 30 in the delay circuit 25 generate delay line outputs 36 that are input into comparators 38 in this embodiment. The comparators 38 may be comparison flip-flops, as an example. The comparators 38 generate a delay output signal 42 upon receipt of a clock period delay signal 40 from the clock period delay 34. The delay output signal 42 is received from the delay circuit 25 as an input into the AVS module 28. The delay output signal 42 represents selection of the longest delay path in the delay lines 30 and thus the delay or timing margin in the functional circuit(s) 15. The AVS module 28 uses the timing margin information to determine the desired performance level and the operating frequency corresponding to the desired performance level. The AVS module 28 determines the voltage level for the desired performance level to maintain proper operation of the functional circuit(s) 15 while avoiding or reducing voltage margin. The AVS module 28 selects the next operating frequency of the functional circuit(s) 15. More specifically, the AVS module 28 generates the operating frequency setting signal 16 to control the clock generator 14 to change the clock signal 12 according to the next operating frequency. In this embodiment, the AVS module 28 is a software-controlled processor or controller. However, the AVS module 28 could also be provided by discrete logic without a processor or software or partially controllable by software executing in a circuit.

The AVS module 28 determines a new voltage level for powering the functional circuit(s) 15 based on an indication that a new operating frequency should be provided to the functional circuit(s) 15. The new voltage level is a safe minimum voltage level for the operating frequency for proper operation of the functional circuit(s) 15 while also avoiding or reducing voltage margin. The AVS module 28 may adjust the voltage level based on delay variation conditions that can shift the relationship between operating frequency and voltage level in the functional circuit(s) 15. Various embodiments are disclosed herein that illustrate examples of the AVS module 28 determining the new voltage level for the new operating frequency. Once the AVS module 28 determines the new voltage level for the new operating frequency, the AVS module 28 applies the new voltage level. The AVS module 28 generates the voltage level setting signal 20 to provide the new voltage level to the voltage regulator 22. The voltage regulator 22 generates the voltage signal 18 at the new voltage level to power the functional circuit(s) 15. The clock signal 12 and the voltage signal 18 are also inputs into the AVS 11 during a next iteration of the tuning loop 24 to provide adaptive control of the voltage level of the functional circuit(s) 15 based on operating frequency and delay variation conditions in the functional circuit(s) 15.

The AVS module 28 may additionally use an operating temperature level signal 46 received from a temperature sensor 48, optionally included in the AVS 11, to further adjust the voltage level for the next operating frequency. Temperature level can shift the minimum voltage level for maintaining proper operation of the functional circuit(s) 15 at a given operating frequency. More information regarding the use of temperature level by the AVS 11 to determine voltage level settings for the functional circuit(s) 15 will be described later below.

As previously discussed, one function of the AVS module 28 determines a new voltage level for powering the functional circuit(s) 15 for a given new, determined operating frequency. One example of the AVS module 28 determining the new voltage level is provided in the AVS frequency/voltage level table 50 in FIG. 2. The AVS frequency/voltage level table 50 may be stored in a database 44 (also referred to herein as "AVS database 44") and accessed by the AVS module 28 for determining the new voltage level. The AVS module 28 may also update learned voltage levels in the AVS frequency/voltage level table 50, as will be described herein. The AVS module 28 may be a software-controlled module or processor that executes software instructions to access voltage levels in the AVS frequency/voltage level table 50 to determine the next voltage level. Alternatively, the AVS module 28 may be partially controllable by software executed by the AVS module 28. The AVS module 28 may also execute software instructions to determine the next operating frequency and voltage level. Providing the AVS module 28 as a software-based module allows parameters and algorithms contained therein for determining operating frequency and voltage levels as well as information stored in the AVS database 44 to be easily configured or re-configured after the AVS 11 and the functional circuit(s) 15 are designed and/or manufactured. However, the AVS module 28 could also be provided in electrical circuits without the use of software-based modules or devices.

The AVS frequency/voltage level table 50 in FIG. 2 represents a safe, preselected minimum voltage level for the functional circuit(s) 15 for various given operating frequencies to avoid or reduce voltage margin while maintaining proper operation of the functional circuit(s) 15. Thus, the AVS frequency/voltage level table 50 is specific to the functional circuit(s) 15. The AVS frequency/voltage level table 50 in this embodiment contains a finite number of operating frequency and voltage level pairs 52. For example, as illustrated in FIG. 2, the minimum voltage level stored in the AVS frequency/voltage level table 50 for operating frequency $f_1$ is 1.32 Volts (V). Operating frequency $f_1$ may be 1.0 GigaHertz (GHz) as an example. The minimum voltage level lowers as the operating frequency lowers. The AVS frequency/voltage level table 50 could be designed to contain any number of operating frequency and voltage level pairs desired in the AVS database 44. Voltage levels for operating frequency points not contained in the AVS frequency/voltage level table 50 can be interpolated by the AVS module 28 in this embodiment. If it is not desired to assume linearity, the AVS module 28 could set the voltage level for an operating frequency not contained in the AVS frequency/voltage level table 50 to the voltage level of the next highest operating frequency contained in the AVS frequency/voltage level table 50.

On reset of the AVS 11, the tuning loop 24 has not yet iterated to allow the AVS module 28 to adaptively determine the voltage level. Thus, in one embodiment, the AVS frequency/voltage level table 50 can be initialized with known, safe voltage levels for each operating frequency point contained therein until adaptive voltage levels are learned. Alternatively, the AVS frequency/voltage level table 50 could initially register all operating frequency points contained therein as being uninitialized. The AVS module 28 could populate the voltage levels in the AVS frequency/voltage level table 50 as each new operating frequency contained therein is explored by the AVS module 28 and a new voltage level is determined for the new operating frequency.

Figure 3:
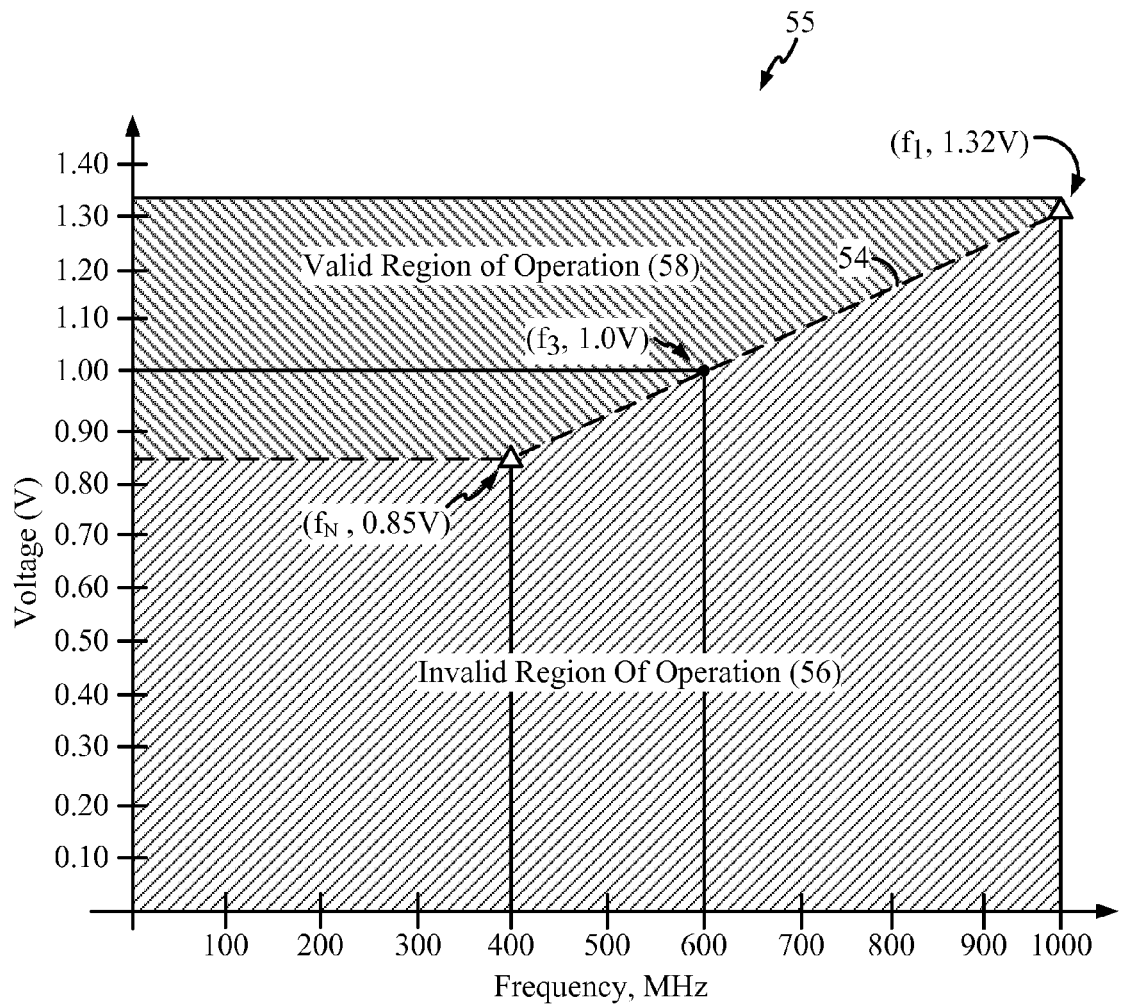
FIG. 3 is an exemplary operating frequency versus voltage level diagram illustrating regions of operation of a functional circuit(s)

Although the AVS frequency/voltage level table 50 in FIG. 2 contains a finite number of operating frequency and voltage level pairs 52, this representation is simply a function of digital storage of points along an operating frequency versus voltage level characteristic curve of the functional circuit(s) 15. In FIG. 3, an example of an exemplary operating frequency, voltage level characteristic curve 54 (also referred to herein as "characteristic curve 54") for the functional circuit(s) 15 is illustrated in an operating frequency versus voltage level diagram 55 provided therein. The characteristic curve 54 represents the minimum voltage level required by the functional circuit(s) 15 for a given operating frequency over the range of possible operating frequencies. Any operating frequency, voltage level point below the characteristic curve 54 is in an invalid region of operation 56 for the functional circuit(s) 15. Any operating frequency, voltage level point on or above the characteristic curve 54 is in a valid region of operation 58 for the functional circuit(s) 15. Note that the characteristic curve 54 also illustrates the minimum operating voltage to properly operate the functional circuit(s) 15 regardless of the operating frequency, which is 0.85 V in the example of FIGS. 2 and 3.

As an alternative to the AVS frequency/voltage level table 50, the operating frequency and voltage level pairs 52 could be determined by a polynomial provided in the AVS database 44 or AVS module 28 that approximates the characteristic curve 54. The characteristic curve 54 could also be represented by multiple polynomials, each representing a sub-range of operating frequencies in the characteristic curve 54, which may allow lower-order polynomials to be used to represent the characteristic curve 54.

Although the operating frequency, voltage level characteristic curve 54 represents the ideal minimum voltage levels for operating frequencies of the functional circuit(s) 15 in this example, delay variation conditions can shift the characteristic curve 54 from ideal conditions. Delay variation conditions can be any conditions that can change delay in a given delay path in a functional circuit. For example, delay variation conditions can include process variations across individual integrated circuits (ICs) resulting during the manufacture of the ICs. Environmental conditions, such as operating temperature and aging effect of transistors, can also affect propagation delay in the functional circuit(s) 15. Voltage levels supplied by voltage supplies can be momentarily lowered due to variations in current draw, thus momentarily lowering performance of the functional circuit(s) 15. Thus, the AVS 11 can include a number of additional features and devices according to other embodiments to provide additional benefits and performance to further adaptively optimize the avoidance or reduction of voltage margin while maintaining proper operation of the functional circuit(s) 15. These additional features and device embodiments will now be described.

Figure 4:
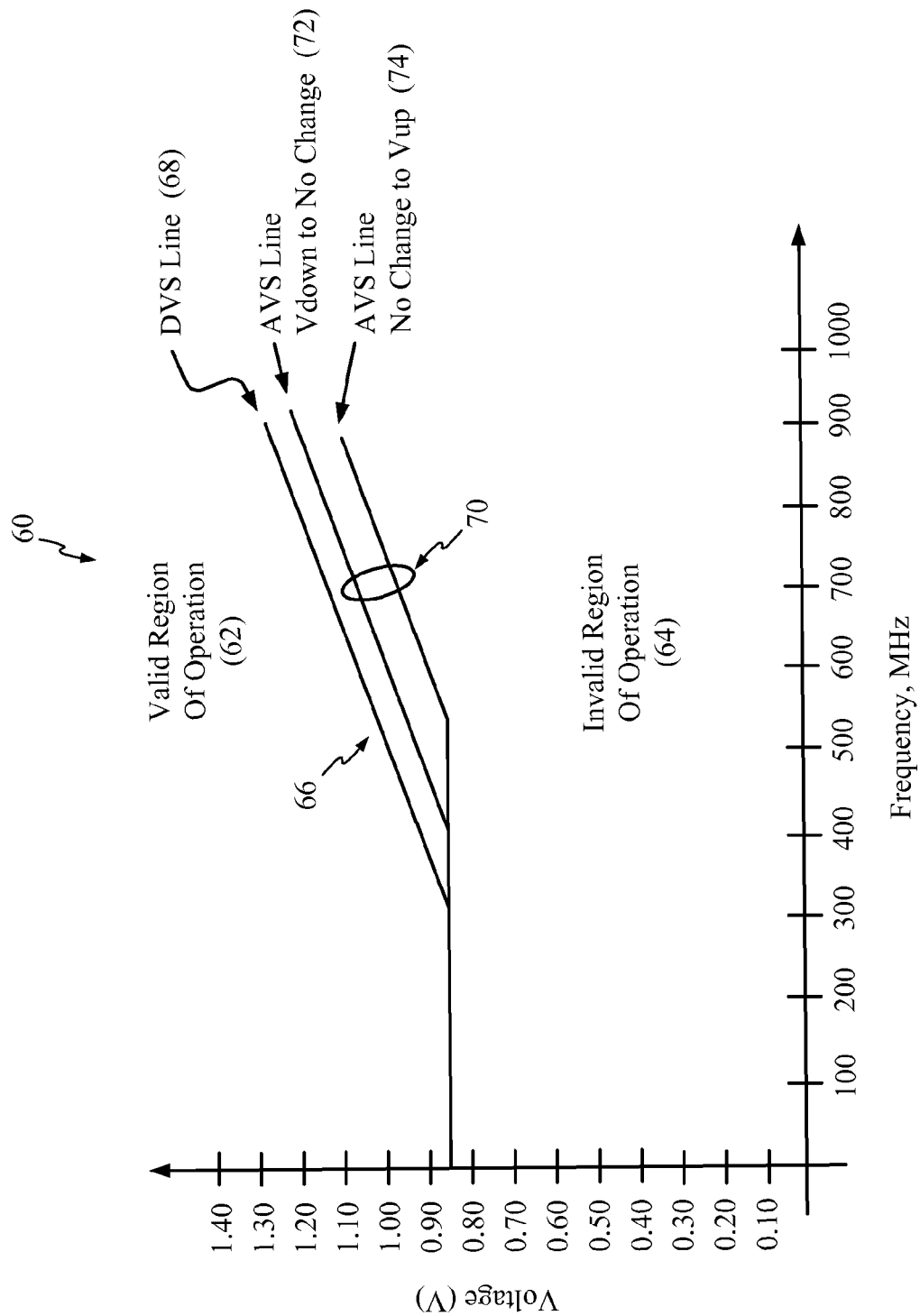
FIG. 4 is an exemplary operating frequency versus voltage level diagram illustrating exemplary dynamic voltage scaler (DVS) and adaptive voltage scaler (AVS) regions for a functional circuit(s)

FIG. 4 illustrates an exemplary operating frequency versus voltage diagram 60 to facilitate further discussion of the AVS 11 in FIG. 1. As illustrated in FIG. 4, the functional circuit(s) 15 has two regions of operation: a valid region of operation 62 and an invalid region of operation 64. A set of characteristic curves 66 of the functional circuit(s) 15 is a line formed by the operating frequency and minimum voltage level value pairs in the valid region of operation 62. The characteristic curves 66 separate the valid region of operation 62 from the invalid region of operation 64. There is a minimum voltage level for proper operation of the functional circuit(s) 15 regardless of the operating frequency, which is illustrated by example as 0.85 V in this example. Above a defined operating frequency, the minimum voltage level must be increased to keep the functional circuit(s) 15 in the valid region of operation 62.

A dynamic voltage scaler (DVS) line 68 indicates the lower bound of operation of the functional circuit(s) 15 should a DVS be employed to control the voltage level in the functional circuit(s) 15. The DVS line 68 provides the minimum voltage level for the valid region of operation 62 across all acceptable variations in processes and operating conditions in the functional circuit(s) 15. AVS lines 70 illustrate bounds of operation of the functional circuit(s) 15 lower than the DVS line 68. The AVS lines 70 represent a reduction in voltage margin due to the AVS 11 taking into consideration delay variations in processes and operating conditions in the functional circuit(s) 15 when determining and setting the voltage level in the functional circuit(s) 15. There are two AVS lines 72, 74 that represent three possible decisions from the AVS 11 in FIG. 1. This is due to the comparators 38 including comparison flip-flops that may have some built-in hysteresis. The three possible decisions are as follows:

"Vdown" condition, meaning the current voltage level is higher than necessary for proper functional circuit(s) 15 operation;

"No change" condition, meaning the current voltage level is adequate for proper functional circuit(s) 15 operation; and "Vup" condition, meaning the current voltage level is lower than necessary for proper functional circuit(s) 15 operation.

The desirable point at which to operate the functional circuit(s) 15 from a power consumption perspective is the AVS line 74 that defines the transition from the region of operation from "No Change" to "Vup." On this AVS line 74, the minimum voltage level possible for operation of the functional circuit(s) 15 in the valid region of operation 62 is provided. However, little or no voltage margin tolerance is provided on the AVS line 74. If the AVS line 74 was used by the AVS module 28 to control the voltage level, a "Vup" condition could occur indicating invalid operation for the functional circuit(s) 15 due to the timing delay associated with the AVS 11 measuring the operating frequency of the clock signal 12. As a result, the AVS module 28 may set the voltage level in the invalid region of operation 64 during certain periods of time. A "Vup" condition may cause the AVS 11 and functional circuit(s) 15 to reset. Thus, in one embodiment of the AVS 11, the AVS line 72 is used to determine the voltage level for a given operating frequency. The AVS line 72 reduces voltage margin over the DVS line 68, but includes voltage margin tolerance over the AVS line 74 to avoid operating the functional circuit(s) 15 in the invalid region of operation 64. Embodiments further described herein further reduce voltage margin from the AVS line 72 to zero voltage margin on the AVS line 74 or as close to zero voltage margin as possible.

Figure 5:
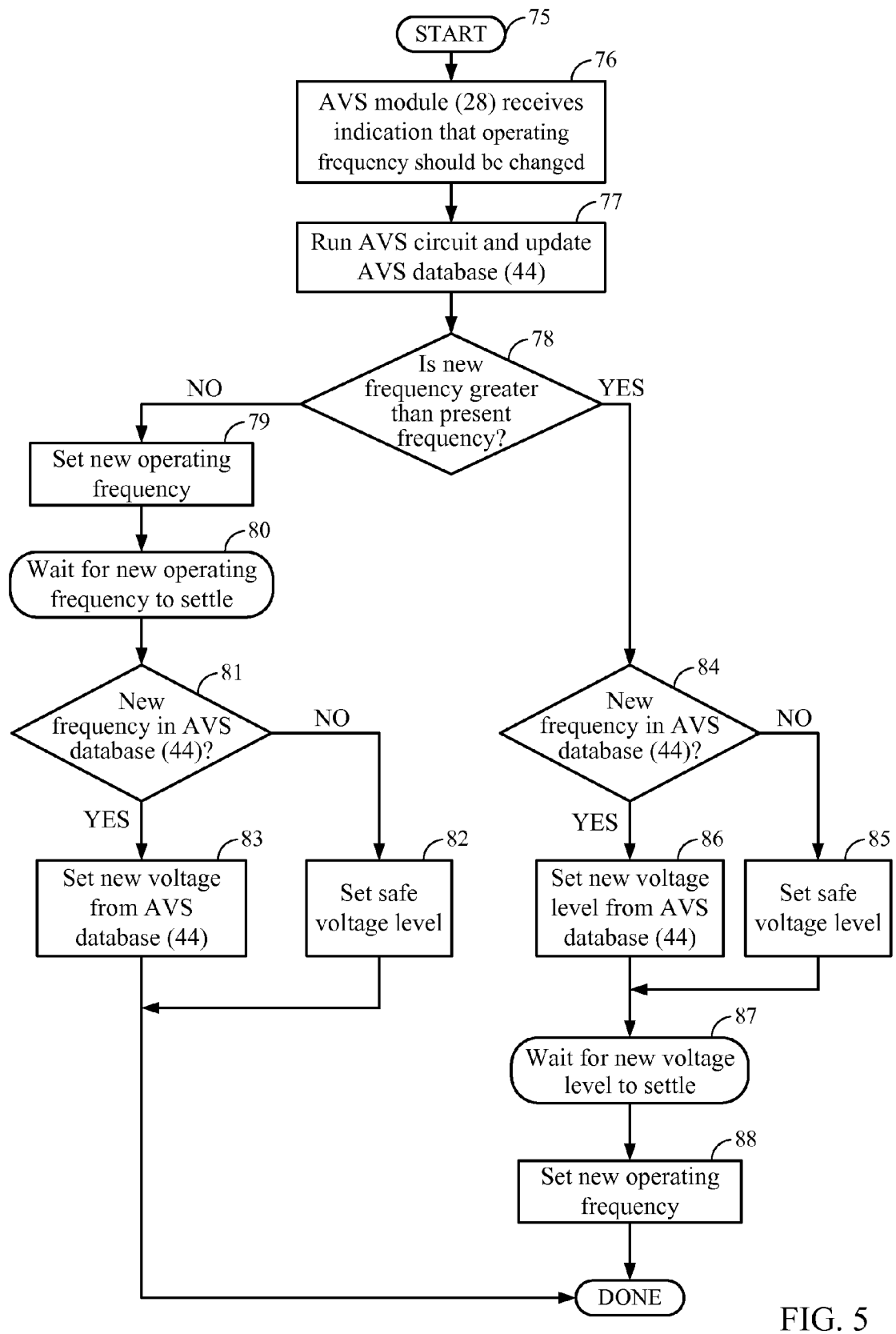
FIG. 5 is a flowchart providing an exemplary process for utilizing an AVS database to adaptively store and use learned voltage levels for setting the voltage level of the functional circuit(s) based on operating frequency to avoid or reduce voltage margin.

As discussed above, the AVS module 28 is configured to determine and set an operating frequency and voltage level for the functional circuit(s) 15. In this regard, FIG. 5 provides a flowchart of one exemplary process that can be performed by the AVS module 28 in the AVS 11 to adaptively determine and set the operating frequency and voltage level for the functional circuit(s) 15 in response to an indication that a new operating frequency should be provided for the functional circuit(s) 15 based on stored, learned voltage level settings stored in the AVS database 44. The process in FIG. 5 is executed by the AVS module 28 as part of the tuning loop 24 in this embodiment. The AVS module 28 is also capable of adaptively determining and setting an operating frequency and voltage level for the functional circuit(s) 15 in response to other conditions not related to the receipt of an indication that a new operation frequency should be provided for the functional circuit(s) 15, as will be described in more detail below. With reference to FIG. 5, the process starts (block 75) by the AVS module 28 receiving an indication that the operating frequency for the functional circuit(s) 15 should be changed (block 76). The AVS module 28 receives the indication as the workload estimate 27 in this embodiment, as illustrated in FIG. 1. In this embodiment, the AVS module 28 next determines the voltage level for the current operating voltage and updates the AVS database 44 accordingly, as will be described in greater detail below, before setting a new operating frequency and voltage level (block 77). Alternatively, the AVS module 28 could be configured to execute and update the AVS database 44 after a new operating frequency and voltage level for the functional circuit(s) 15 have been set. Other features and functions may be performed by the AVS module 28 as will also be described in more detail below.

The AVS module 28 then determines if the new operating frequency is greater than the current operating frequency (block 78). If the new operating frequency is not greater than the current operating frequency, the AVS module 28 can go forward immediately with setting the operating frequency setting signal 16 for the new operating frequency without having to determine if the voltage level for the functional circuit(s) 15 should be adjusted (block 79). The functional circuit(s) 15 is known to be able to properly operate at a lower operating frequency for the current voltage level setting. However, it is still desired to reduce the current voltage level if possible to avoid or reduce voltage margin. In this regard, the AVS module 28 waits for the new operating frequency to settle in the functional circuit(s) 15 (block 80) to determine a new voltage level for the functional circuit(s) 15. This may take several clock cycles and iterations of the tuning loop 24.

Once the new operating frequency has settled, the AVS module 28 determines if the new operating frequency has been previously explored by the AVS module 28 in the AVS database 44 (block 81). If not, the AVS module 28 programs the voltage level to a known safe voltage level for the new operating frequency (block 82). The safe voltage level may be based on a DVS setting. If the new operating frequency has been previously explored or learned by the AVS module 28 in the AVS database 44 (block 81), the AVS module 28 sets the voltage level setting signal 20 to the new voltage level for the functional circuit(s) 15 based on the learned voltage level stored in the AVS database 44 (block 83). As discussed in more detail below, the AVS module 28 is configured to store learned voltage levels corresponding to explored operating frequencies in the AVS database 44 to avoid or reduce voltage margin based on variation and operation conditions of the functional circuit(s) 15. The learned voltage level may be lower than the safe voltage level thus reducing energy consumption by the functional circuit(s) 15. The voltage level can be lowered more rapidly in the functional circuit(s) 15 than it would otherwise be by use of the AVS database 44 to store learned voltage levels. This is illustrated by example in FIGS. 6 and 7A-7B, discussed below.

Figure 6:
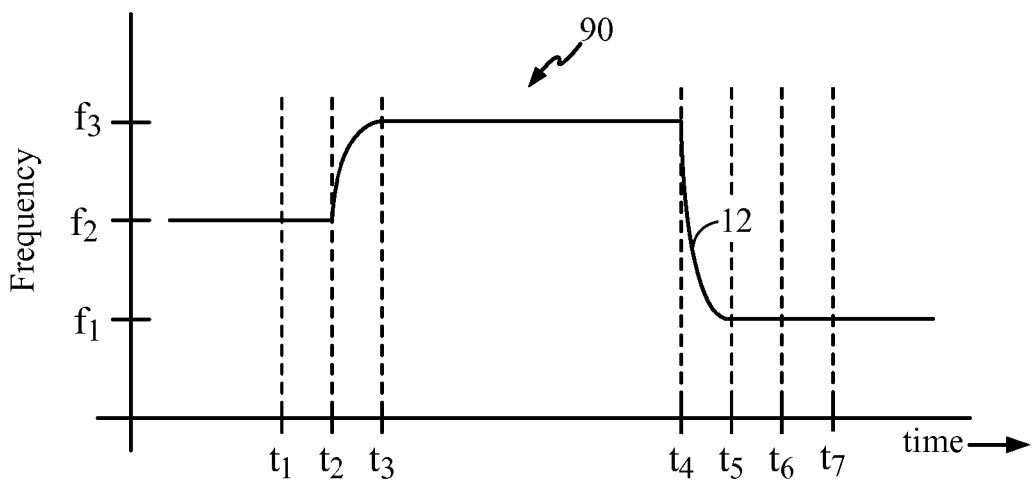
FIG. 6 is an exemplary operating frequency timing diagram of a clock signal generated by a clock generator under control of the AVS in FIG. 1.
Figure 7A:
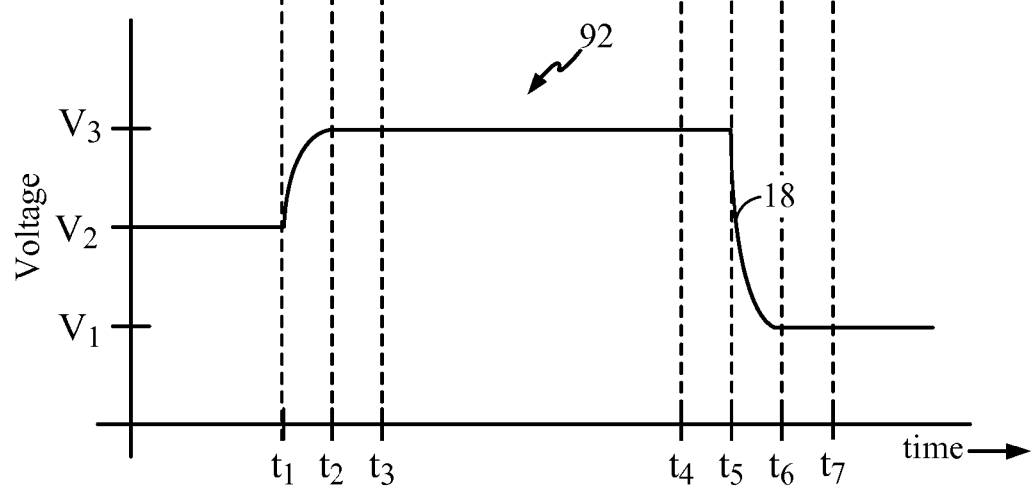
FIG. 7A is an exemplary voltage level timing diagram of a voltage signal generated by a voltage regulator under control of the AVS in FIG. 1.
Figure 7B:
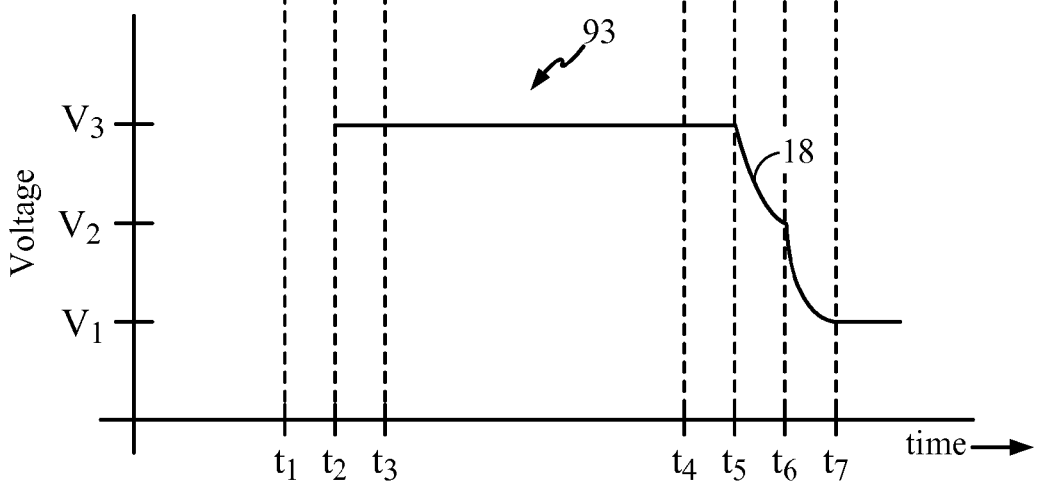
FIG. 7B is an exemplary voltage level timing diagram of a voltage signal if a new voltage level could not be set by the AVS without having to wait for a new operating frequency to settle.

FIG. 6 illustrates an exemplary operating frequency timing diagram 90 of the clock signal 12 generated by the clock generator 14 under the control of the AVS 11 in FIG. 1. FIG. 7A illustrates a corresponding exemplary voltage level timing diagram 92 of the voltage signal 18 generated by the voltage regulator 22, also under the control of the AVS 11 in FIG. 1. As illustrated in FIG. 6, the clock signal 12 is at operating frequency $f_3$ from time $t_3$ to time $t_4$. At time $t_4$, the AVS module 28 has set the new operating frequency for the clock generator 14 to $f_1$ (see, e.g., FIG. 5, block 79). The operating frequency of the clock signal 12 starts to drop from $f_3$ to $f_1$ between times $t_4$ and $t_5$ and stabilizes at frequency $f_1$ at time $t_5$. Once the AVS module 28 has determined that the new operating frequency has settled in the functional circuit(s) 15 (see, e.g., FIG. 5, block 80), the AVS module 28 consults the AVS database 44. The AVS module 28 consults the AVS database 44 to determine if a voltage level for the new operating frequency $f_1$ has previously been explored and learned (see, e.g., FIG. 5, block 81). In this example, the AVS database 44 contained a previously explored and learned voltage level for the new operating frequency $f_1$ (see, e.g., FIG. 5, block 83). Thus, as illustrated in the voltage level timing diagram 92 in FIG. 7A, the AVS module 28 was able to set the voltage level setting signal 20 to generate and set the voltage signal 18 to the new and previously learned voltage level one clock cycle without having to wait for the new operating frequency to settle. Otherwise, the AVS module 28 would not be able to set the voltage level setting signal 20 to the new voltage level in one clock cycle as illustrated in the voltage level timing diagram 93 of FIG. 7B. The process continues by returning back to the start (block 75) to repeat the steps in FIG. 5 in a looping fashion each time the AVS module 28 receives an indication that a new operating frequency should be provided to the functional circuit(s) 15.

If the new operating frequency is greater than the current operating frequency (block 78), as illustrated by example at time $t_i$ in the voltage level timing diagram 92 of FIG. 7A, the AVS module 28 does not immediately set the operating frequency setting signal 16 to the new operating frequency. This is illustrated by example at time $t_1$ in the operating frequency timing diagram 90 of FIG. 6. This is because the AVS module 28 determines a new voltage level first to ensure the functional circuit(s) 15 properly operates before setting the new operating frequency. In this regard, the AVS module 28 determines if the new operating frequency has been previously explored by the AVS module 28 in the AVS database 44 (block 84). If not, the AVS module 28 programs the voltage level to a known safe voltage level for the new operating frequency (block 85). The safe voltage level may be based on a DVS setting. If the new operating frequency has been previously explored by the AVS module 28 in the AVS database 44 (block 84), the AVS module 28 sets the voltage level setting signal 20 to the new voltage level for the functional circuit(s) 15 based on the learned voltage level stored in the AVS database 44 (block 86). Again, the AVS module 28 is configured to store learned voltage levels corresponding to explored operating frequencies in the AVS database 44 to more rapidly lower the voltage level to avoid or reduce voltage margin based on variation and operation conditions of the functional circuit(s) 15. The learned voltage level will typically be lower than the safe voltage level thus reducing energy consumption by the functional circuit(s) 15. Thereafter, the AVS module 28 waits for the new voltage level to settle in the functional circuit(s) 15 (block 87) (e.g., $t_1$-$t_2$). Additional frequency margin may be present while the AVS module 28 waits for the new voltage level to settle before the new operating frequency can be set. After the new voltage level has settled, the AVS module 28 can safely adjust the new operating frequency for the functional circuit(s) 15 to the higher operating frequency (block 88) (e.g., $t_1$-$t_3$). The process continues by returning back to the start (block 75) to repeat the steps in FIG. 5 in a looping fashion each time the AVS module 28 receives an indication that a new operating frequency should be provided to the functional circuit(s) 15.

In one embodiment, the AVS database 44 can be utilized to store learned, optimal voltage level settings that have already been explored by the AVS 11 for a given operating frequency or frequencies. In this manner, the AVS module 28 can generate the voltage level setting signal 20 to return the functional circuit(s) 15 to a specific, optimal voltage level setting rapidly for new operating frequencies that have been previously explored without having to wait for the new operating frequency to settle. Any additional voltage margin present between the time of the setting of the new operating frequency by the AVS module 28 and the settling of the new operating frequency can be avoided or reduced to further conserve total power consumption by the functional circuit(s) 15.

In this regard, FIG. 8 illustrates an example of an AVS learned values table 100 that may be stored and maintained in the AVS database 44 as part of the AVS 11 learning voltage levels for previously explored operating frequencies. Any number of operating frequencies may be stored. The AVS module 28 in the AVS 11 can consult the AVS learned values table 100 to determine if a voltage level has previously been explored and learned for a particular operating frequency as previously discussed (see, e.g., FIG. 5, blocks 81 and 84). The AVS module 28 may update the AVS learned values table 100 as part of an updating process of the AVS database 44 (e.g., FIG. 5, block 77).

In this embodiment, as illustrated in FIG. 8, the AVS learned values table 100 is similar to the AVS frequency/voltage level table 50 in FIG. 2. However, the AVS learned values table 100 in this embodiment contains a learned column 102 that indicates whether the corresponding voltage level stored in a voltage level column 104 was previously explored and learned for the corresponding operating frequency in an operating frequency column 106. If a voltage level for a given operating frequency has already been learned, the AVS module 28 could simply select the learned voltage level from the AVS learned values table 100 as opposed to possibly having to wait for the new operating frequency to settle in the functional circuit(s) 15. For example, the learned column 102 could be configured to store an indicator of whether the value stored in the voltage level column 104 is a valid previously explored and learned voltage level using AVS or contains an initial or invalid data. The AVS module 28 can be configured to explore the learned column 102 to make this determination when setting a new voltage level. An unlearned or initial stored voltage level could be based on a DVS or initial voltage level value until an AVS voltage level is determined. For example, the indicator could be a learned bit 108 as illustrated in FIG. 8. A logical "1" could represent a valid or learned value, and a logical "0" could represent an invalid or initial value, or vice versa. As illustrated in FIG. 8, the AVS learned values table 100 contains previously learned voltage levels for operating frequencies $f_1$, $f_2$, and $f_N$. The AVS learned values table 100 does not contain a learned voltage level for operating frequency $f_3$.

The AVS module 28 can continue to update the AVS learned values table 100 in the AVS database 44 with learned voltage level settings. As previously discussed, the AVS module 28 may be configured with a minimum voltage level setting for all operating frequencies of the functional circuit(s) 15 that cannot be breached. In this instance, the AVS module 28 may be configured to not store a learned voltage level setting in the AVS database 44 lower than the minimum voltage level setting for all operating frequencies of the functional circuit(s) 15.

In this example, certain voltage levels stored in the AVS learned values table 100 of FIG. 8 are lower than corresponding voltage levels in the AVS frequency/voltage level table 50 in FIG. 2. This may be due to the AVS 11 accounting for additional delay variations determined by the AVS module 28 in the relationship between voltage levels and operating frequencies in the functional circuit(s) 15. The AVS module 28 may be configured to populate the voltage levels in the AVS learned values table 100 initially with safe voltage levels for the functional circuit(s) 15, such as the voltage levels in the AVS frequency/voltage level table 50 of FIG. 2, until the AVS module 28 adaptively learns other voltage levels based on delay variation conditions. When a voltage level is adaptively learned, the AVS module 28 could change the learned bit 108 in the AVS learned values table 100 corresponding to the operating frequency from a logical "0" (meaning initial or invalid) to a logical "1" as an example, or vice versa. Typically, the learned voltage levels will be lower in voltage level than the initial voltage levels since the purpose of the AVS 11 is to reduce voltage margin based on operational parameters and delay conditions in the functional circuit(s) 15.

Other conditions and variations can occur where it may be desired to configure the AVS module 28 to determine if a new voltage level should be provided beyond an indication of a new operation frequency for the functional circuit(s) 15. For example, changes in temperature levels of the functional circuit(s) 15 can shift the voltage levels that define the valid region of operation for the functional circuit(s) 15. Typically, the lower the temperature, the faster the functional circuit(s) 15 will be capable of operating. Likewise, the higher the temperature, typically, the slower the functional circuit(s) 15 will be capable of operating. This is illustrated by the exemplary operating temperature versus voltage level diagram 110 in FIG. 9. As illustrated therein by example, a functional circuit(s) 15 may properly operate in a valid region of operation 112 at a minimum voltage level setting of 1.2 V at an operating temperature of forty degrees Celsius (40° C.) at operating frequency "f". Voltage levels below 1.2V for an operating temperature of forty degrees Celsius (40° C.) at operating frequency "f" would place the functional circuit(s) 15 in an invalid region of operation 114. However, if the operating temperature level lowers, the voltage level setting may be lowered and the functional circuit(s) 15 remains in the valid region of operation 112 at the same operating frequency "f". For example, at an operating temperature level of twenty degrees Celsius (20° C.), the voltage level setting may be lowered to 1.0 V. In this example, there is a 0.2 V difference between minimum voltage levels of an operating temperature level between 20° C. and 40° C. for operating frequency "f". The AVS 11 previously discussed may react to temperature level changes by changing the voltage level setting, if necessary, to maintain proper operation of the functional circuit(s) 15 while avoiding or reducing voltage margin (e.g., "Vup" and "Vdown" commands).

Figure 9:
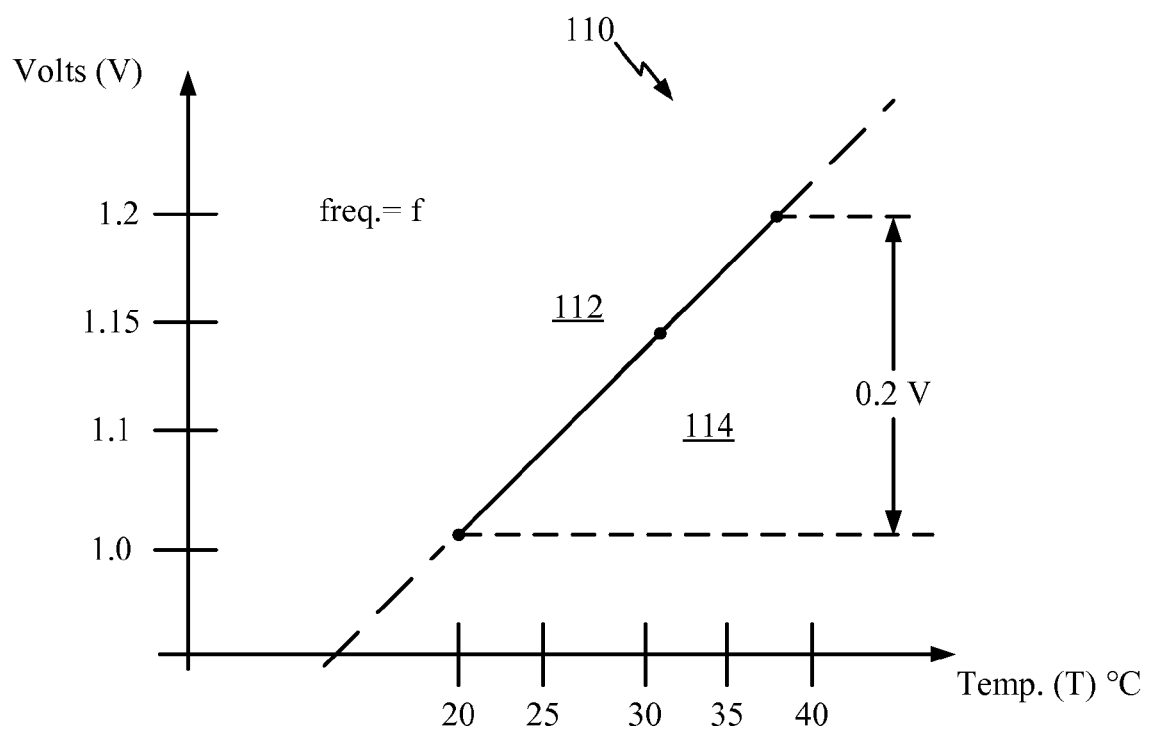
FIG. 9 is an exemplary operating temperature versus voltage level diagram illustrating an exemplary minimum voltage level for a functional circuit(s) at a given operating frequency over an exemplary temperature level band.

As an example, assume that the operating frequency of the functional circuit(s) 15 is higher than operating frequency "f" in the example of FIG. 9. Assume next that the AVS 11 received an indication to change the operating frequency to "f". In this example, the AVS module 28 would consult the AVS database 44 to determine the new voltage level setting. The new voltage level setting may be a previously learned voltage level setting stored in the AVS database 44 for the new operating frequency, as previously discussed. However, the new voltage level setting required to properly operate the functional circuit(s) 15 can be dependent on temperature level. The temperature level may be unknown if a temperature or sensing device is not provided in the AVS 11. Thus, the previously learned voltage level setting for the new operating frequency "f" may have been for a previous lower temperature level than the current temperature level of the functional circuit(s) 15. In this regard, if the AVS 11 uses the previously learned voltage level to set the new voltage level, this voltage level setting may be too low for the new operating frequency for proper operation of the functional circuit(s) 15 for the current operating temperature since the previous and current temperature levels are unknown.

Figure 10:
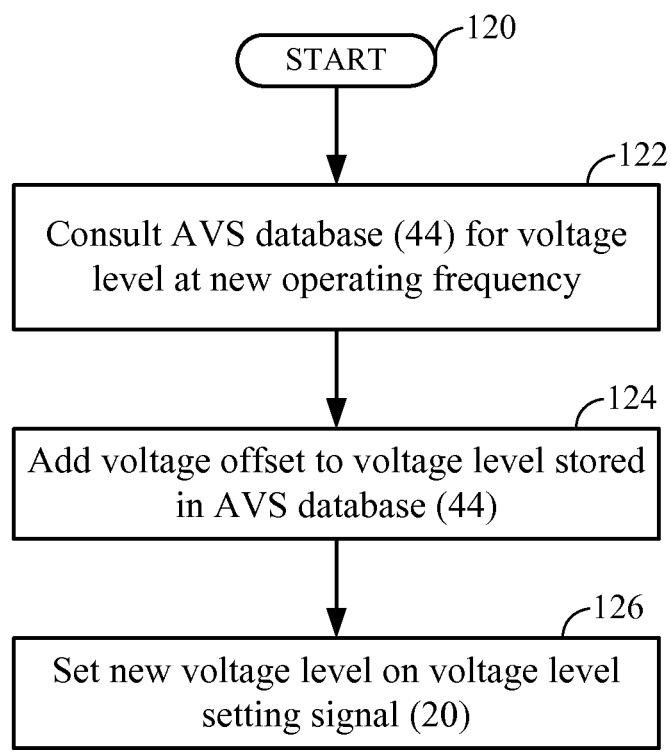
FIG. 10 is a flowchart providing an exemplary process for adding an offset voltage to a voltage level provided to a functional circuit(s) corresponding to an operating frequency.
Figure 11:
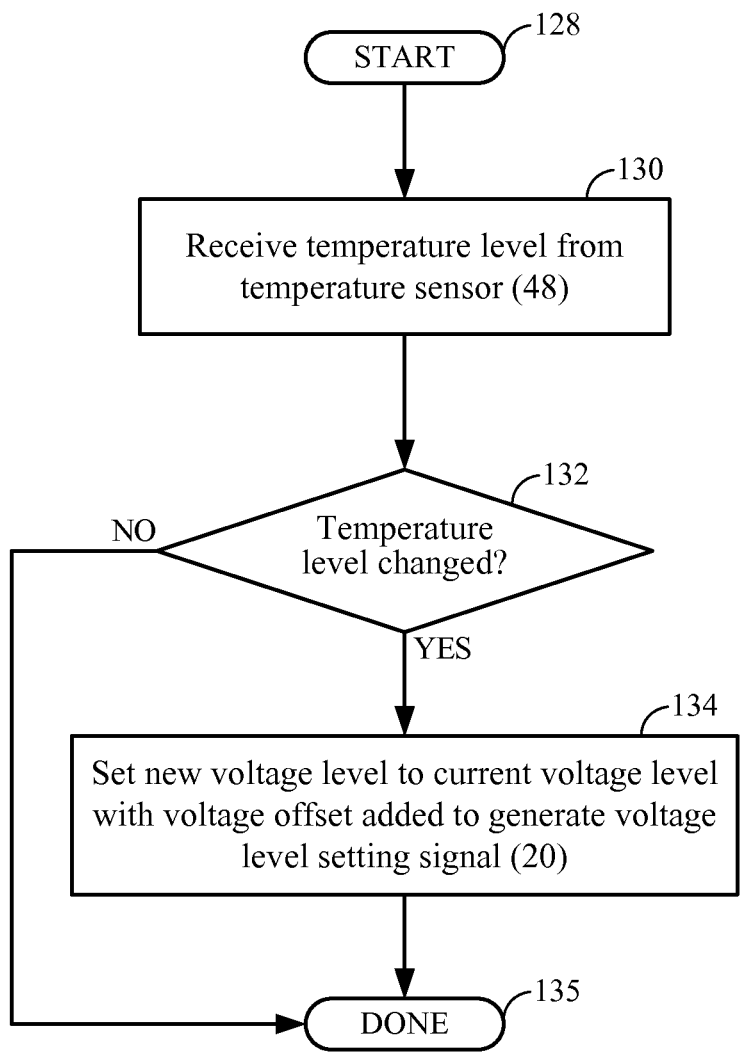
FIG. 11 is a flowchart providing an exemplary process for adding an offset voltage to a voltage level provided to a functional circuit(s) corresponding to an operating frequency when the temperature level band of the functional circuit(s) changes.

In this regard, FIG. 10 is a flowchart providing an exemplary process that can be performed by the AVS module 28 to add an offset voltage to a new determined voltage level. The new voltage level may be determined in response to an indication to provide a new operating frequency to the functional circuit(s) 15. FIG. 11 is a flowchart providing an exemplary process that can be performed by the AVS module 28 to add an offset voltage to a new determined voltage level in response to a detected change in temperature level of the functional circuit(s) 15. In this manner, if the voltage level setting stored in the AVS database 44 is too low for proper operation of the functional circuits(s) 15, the voltage level setting with the added voltage offset can be sufficient to safely operate the functional circuit(s) 15. The AVS 11 will eventually lower this new voltage level, if possible, through normal operation to avoid or reduce voltage margin in the functional circuit(s) 15, as previously discussed.

With reference to FIG. 10, the process disclosed therein can be performed in either blocks 83 or 86 of FIG. 5 in this example, where a new voltage level is set for the functional circuit(s) 15. The process starts (block 120) and the AVS module 28 consults the AVS database 44 for the stored voltage level corresponding to the new operating frequency (block 122). The AVS module 28 then adds an offset voltage to the voltage level stored in the AVS database 44 corresponding to the new operating frequency (block 124). The AVS module 28 then sets the new voltage level adjusted with the voltage offset as the voltage level setting signal 20 to provide the new voltage level to the functional circuit(s) 15 for operation (block 126). The offset voltage can be any voltage level desired. The offset voltage may be a fixed voltage offset stored in the AVS database 44. The voltage offset may be selected based on the expected variation in voltage level between different operating temperatures in the functional circuit(s) 15. Thus, the offset voltage may be influenced by the AVS module 28 and its configuration used to control the voltage level setting signal 20 provided to the voltage regulator 22 to control the voltage level provided to the functional circuit(s) 15.

FIG. 11 is a flowchart providing another exemplary process for adding an offset voltage to a new voltage level corresponding to an operating frequency when a change in temperature level occurs. In this embodiment, the AVS module 28 is configured to add an offset to the voltage level setting signal 20 when a temperature change occurs as opposed or in addition to when an indication of a new operating frequency is provided. The process illustrated in the flowchart of FIG. 11 may be performed by the AVS module 28 as part of the tuning loop 24, if desired. When the temperature level of the functional circuit(s) 15 changes, the previously stored or learned voltage level setting in the AVS database 44 may not be sufficient to allow the function circuit(s) 15 to properly operate. Thus, adding a voltage offset can ensure that a safe initial new voltage level is provided when the temperature changes for the functional circuit(s) 15. The AVS 11 will then operate to lower the voltage level adaptively as part of normal operation, if possible. As illustrated in FIG. 11, the process starts (block 128) and the AVS module 28 receives the current temperature level from the temperature sensor 48 via the operating temperature level signal 46 (block 130). If the temperature level has changed, for example by more than a certain threshold level or percentage from a previous operating temperature level, the AVS module 28 sets the new voltage level to the current voltage level with a voltage offset added to the voltage level setting signal 20 (block 134), and the process completes (block 135). If the temperature level of the functional circuit(s) 15 has not sufficiently changed, no voltage offset need be added to the voltage level setting signal 20, and the process ends (block 135).

Figure 12:
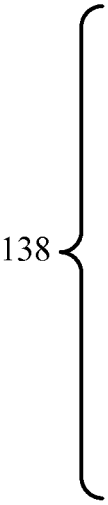
FIG. 12 is an exemplary AVS frequency/voltage level table providing voltage level values as a function of each possible operating frequency temperature level of a functional circuit(s)

FIG. 12 illustrates another exemplary AVS frequency/voltage level table 136 that can be stored in the AVS database 44 and used by the AVS module 28 to determine a new voltage level setting for the functional circuit(s) 15. In this embodiment, the AVS module 28 may be configured to store learned voltage level settings in the AVS database 44 not only as a function of operating frequency, but also as a function of temperature level. For example, the temperature level may be provided to the AVS module 28 from the temperature sensor 48 provided in the AVS 11 of FIG. 1. When the AVS module 28 sets the new voltage level for the functional circuit(s) 15 (e.g., blocks 83 and 86 of FIG. 5), the AVS module 28 consults the AVS frequency/voltage level table 136 based on the new operating frequency and temperature level received from the temperature sensor 48. The AVS module 28 uses the corresponding voltage level stored in the AVS database 44 at the new operating frequency ($f_1, f_2, \ldots f_N$) and current temperature level to set the voltage level setting signal 20 to set the new voltage level in the functional circuit(s) 15. In this example, the AVS frequency/voltage level table 136 contains enough memory locations 138 to store a voltage level for every possible operating frequency and temperature level for the resolution of the temperature sensor 48. In this example, the temperature sensor 48 provides an 8-bit word resolution to provide up to two hundred fifty-six (256) unique temperature levels. Thus, in this example, the AVS frequency/voltage level table 136 contains two hundred fifty-six (256) voltage level entries for each operating frequency.

Voltage level-operating temperature characteristic irregularities or deviations can be present or occur for the functional circuit(s) 15 for a given temperature and performance level. When voltage levels are stored for each temperature level, a variation or irregularity may cause the stored voltage level to be invalid for a given operation frequency. A voltage level offset, which in turn adds voltage margin, could be added to the stored voltage levels as previously discussed. Another solution to account for variations or irregularities could be to store voltage levels based on temperature level ranges or bands rather than for each possible temperature level. In this manner, the stored voltage level covers a temperature level band rather than a specific temperature level. The voltage levels stored for the temperature level bands could be selected to account for variations or irregularities while avoiding or reducing voltage margin that may be present if a single voltage offset were applied to all voltage levels. A voltage offset may still be applied to voltage levels corresponding to individual temperature level bands, but the voltage offset may be less, thus possibly further reducing voltage margin, since it is specific to each temperature level band. Another reason for storing voltage levels for temperature level bands may be to reduce memory requirements. Storing voltage levels for temperature level bands can require less memory than providing or allocating memory in the AVS database 44 sufficient to store voltage levels for each possible temperature level.

Thus, as an alternative to storing voltage levels for each temperature level, temperature level bands may be stored in the AVS database 44 whereby voltage levels are stored for operating frequencies based on a temperature range. One example of storing voltage levels over temperature level bands is illustrated in the AVS frequency/voltage level table 140 in FIG. 13. As illustrated therein, temperature levels 142 are provided in the AVS frequency/voltage level table 140. Voltage levels are stored in the AVS frequency/voltage level table 140 as a function of the temperature levels 142 and operating frequencies 144 ($f_1, f_2, \ldots f_N$). The temperature levels 142 form temperature level bands ($B_1, B_2, B_3, B_4, \ldots, B_N$). For example, temperature level band $B_1$ is a temperature level between sixty and eighty degrees Celsius (60-80° C.). Temperature level band $B_4$ is a temperature level between zero and twenty degrees Celsius (0-20° C.). Note that the embodiments herein are not limited to the exemplary temperature level bands illustrated in FIG. 13. For example, a functional circuit may have an operational range between eighty-five to negative 30 degrees Celsius (−30 to +85° C.) as an example. In this example, the frequency/voltage level table 140 could be configured to include temperature level bands covering this temperature range. When the AVS module 28 sets a new voltage level (e.g., blocks 83 and 86 in FIG. 5), the AVS module 28 can consult the AVS frequency/voltage level table 140 to determine the new voltage level based on the new operating frequency and which temperature level band the current operating temperature falls within in the AVS frequency/voltage level table 140. The AVS module 28 sets the new voltage level for the functional circuit(s) 15 based on the operating frequency and the temperature level band containing the current operating temperature within the AVS frequency/voltage level table 140. In this regard, FIG. 14 is a flowchart illustrating an exemplary process for the AVS module 28 to set a new voltage level for the functional circuit(s) 15.

Figure 14:
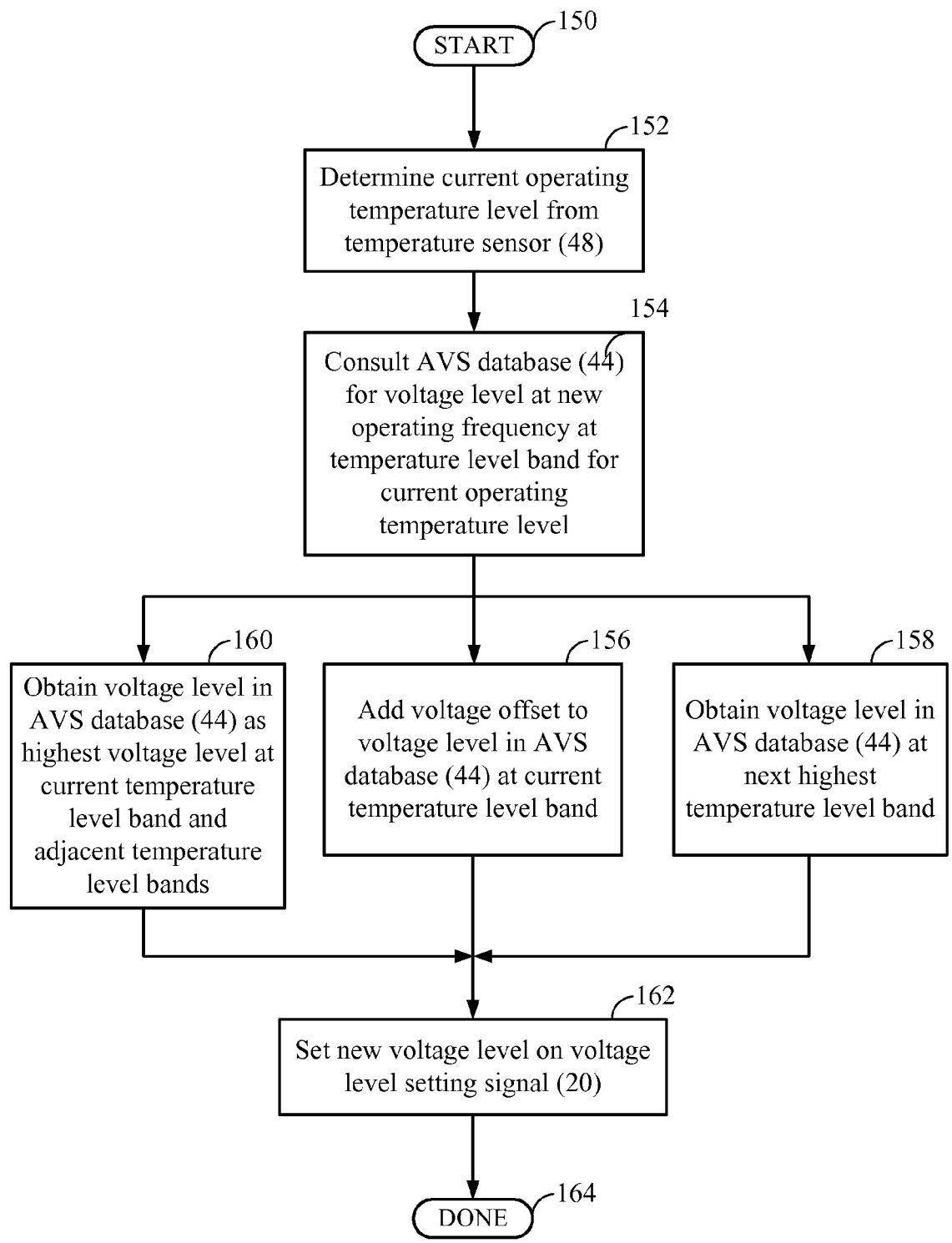
FIG. 14 is a flowchart providing an exemplary process for an AVS determining and setting a new voltage level corresponding to an operating frequency as a function of the temperature level band of a functional circuit(s)

As illustrated in FIG. 14, the process is carried out in this example by the AVS module 28 as part of a voltage level setting task (e.g., blocks 83 and 86 in FIG. 5). The process starts (block 150), and the AVS module 28 determines the current operating temperature level from the temperature sensor 48 (block 152). The AVS module 28 then consults the AVS database 44 for the new voltage level for the new operating frequency at the temperature level band corresponding to the current operating temperature (block 154). For example, the AVS module 28 may consult the AVS frequency/voltage level table 140 in FIG. 13. Depending on the configuration of the AVS module 28, the new voltage level is determined.

As one example, the AVS module 28 may add a voltage offset to the voltage level stored in the AVS database 44 corresponding to the temperature level band of the current temperature level (block 156). In this manner, if the voltage level stored in the AVS database 44 corresponding to the selected temperature level band is not a sufficient voltage level for the current operating temperature of the functional circuit(s) 15, the voltage offset may ensure a safe initial operating voltage level for the functional circuit(s) 15. Alternatively, the AVS module 28 may select the new voltage level from the adjacent higher temperature level band in the AVS frequency/voltage level table 140 (block 158). Selecting a new voltage level among adjacent temperature level bands may assist in reducing or avoiding selecting a new voltage level based on voltage level-operating temperature characteristic irregularities or deviations for the functional circuit(s) 15 for a given temperature and performance level. As another alternative, the AVS module 28 may select the highest voltage level among the current temperature level band and the higher and lower adjacent temperature level bands in the AVS frequency/voltage level table 140 (block 160). The voltage level may be higher in a lower adjacent temperature level band than in an adjacent higher temperature level band in the AVS frequency/voltage level table 140. After the new voltage level is determined by the AVS module 28, the AVS module 28 sets the new voltage level on the voltage level setting signal 20 (block 162), and the process ends (block 164).

Figure 15:
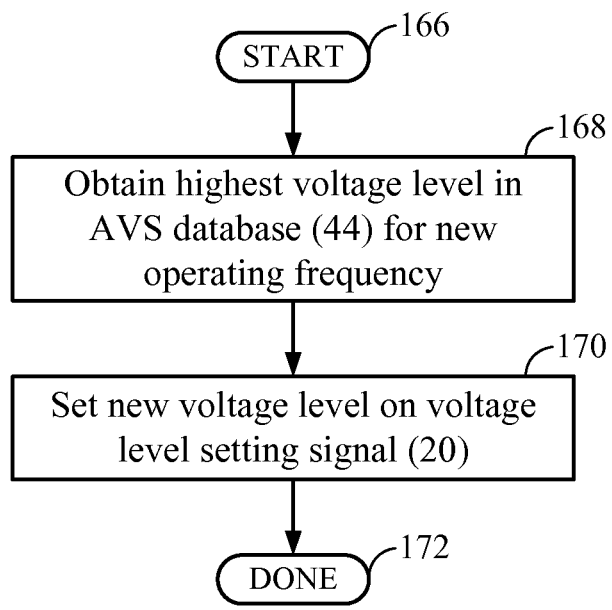
FIG. 15 is a flowchart providing an exemplary process for an AVS determining and setting a new voltage level for a functional circuit(s) corresponding to the highest voltage level for a given temperature level band at a given operating frequency.

Alternatively, the AVS module 28 could select the new voltage level for the functional circuit(s) 15 based on the highest voltage level for all temperature level bands stored in the AVS frequency/voltage level table 140 for a given new operating frequency. In this regard, the AVS module 28 may set the new voltage level setting (e.g., as blocks 83 and 86 in FIG. 5) by the process illustrated in the exemplary flowchart in FIG. 15. As illustrated therein, the process starts (block 166), and the AVS module 28 obtains the highest voltage level stored in the AVS database 44 for the new operating frequency regardless of the current operating temperature (block 168). The AVS module 28 then sets the new voltage level on the voltage level setting signal 20 to provide the new voltage level to the functional circuit(s) 15 (block 170), and the process ends (block 172).

Figure 16:
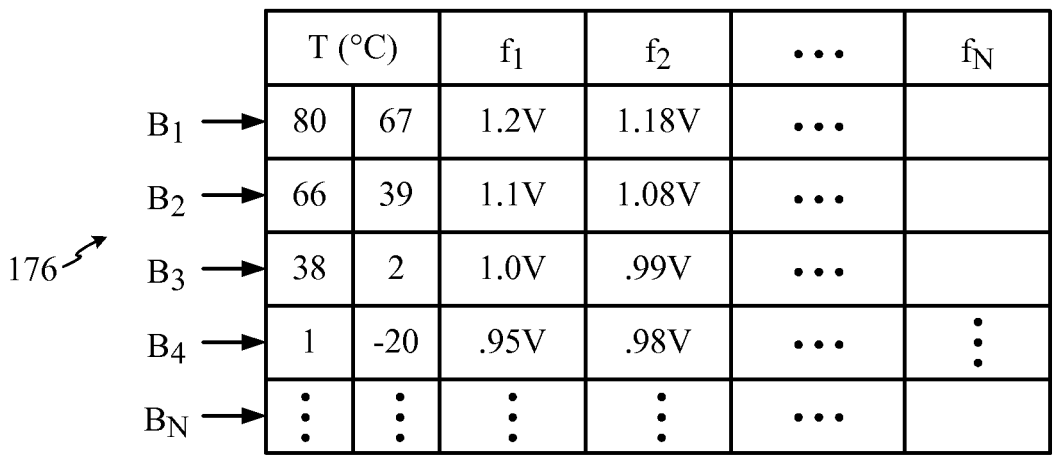
FIG. 16 is another exemplary AVS frequency/voltage level table providing voltage levels as a function of operating frequencies and adjustable temperature level bands.

The AVS module 28 may also be configured to adjust the temperature level bands in an AVS frequency/voltage level table in the AVS database 44 in lieu of fixed temperature level bands like provided in the AVS frequency/voltage level table 140 in FIG. 14. An example is provided in the AVS frequency/voltage level table 174 in FIG. 16. In this example, the temperature levels 176 stored in the AVS frequency/voltage level table 174 can be modified by the AVS module 28. As the AVS module 28 executes to set and/or lower the voltage level for a given operating frequency (e.g. FIG. 5, block 77), the AVS module 28 can be configured to update the temperature level bands in the AVS frequency/voltage level table 174. If the AVS module 28 determines a voltage level for a given operating frequency and temperature level 176, the AVS module 28 can update the appropriate temperature level 176 in the AVS frequency/voltage level table 174 for the new voltage level. Over time, the temperature levels 176 will be adjusted to define temperature level bands. These temperature level bands may be accurate enough wherein providing voltage offset to adjust the stored voltage level may not be performed.

The AVS database 44 may also be configured to store a minimum voltage level for the functional circuit(s) 15 for all operating frequencies to ensure that the voltage level set by the AVS module 28 does not fall below a minimum voltage level for operation of the functional circuit(s) 15. In this regard, FIG. 17 illustrates an exemplary minimum voltage level limit table 190 that may be stored in the AVS database 44. The AVS module 28 may be configured to consult the minimum voltage level limit table 190 in the AVS database 44 for a given current operating frequency before a voltage level is set. If the voltage level determined by the AVS module 28 is lower than the minimum voltage level in the minimum voltage level limit table 190 for the current operating frequency, the AVS module 28 will set the voltage level to the voltage level in the minimum voltage level limit table 190. The minimum voltage level limit table 90 may initially contain the same voltage level for all operating frequencies (e.g., 0.85 V). However, if the AVS module 28 is configured to add voltage margin for a given operating frequency upon a "Vup" condition, the added voltage margin can be added to the minimum voltage level in the minimum voltage level limit table 190. For example, if a "Vup" condition was received at an operating frequency $f_3$, the previous minimum voltage level was 0.90 V, and the added voltage margin was 0.05 V, a minimum voltage level of 0.95 V may be stored for an operating frequency $f_3$ in the minimum voltage level limit table 190, as illustrated in FIG. 17.

Figure 18:
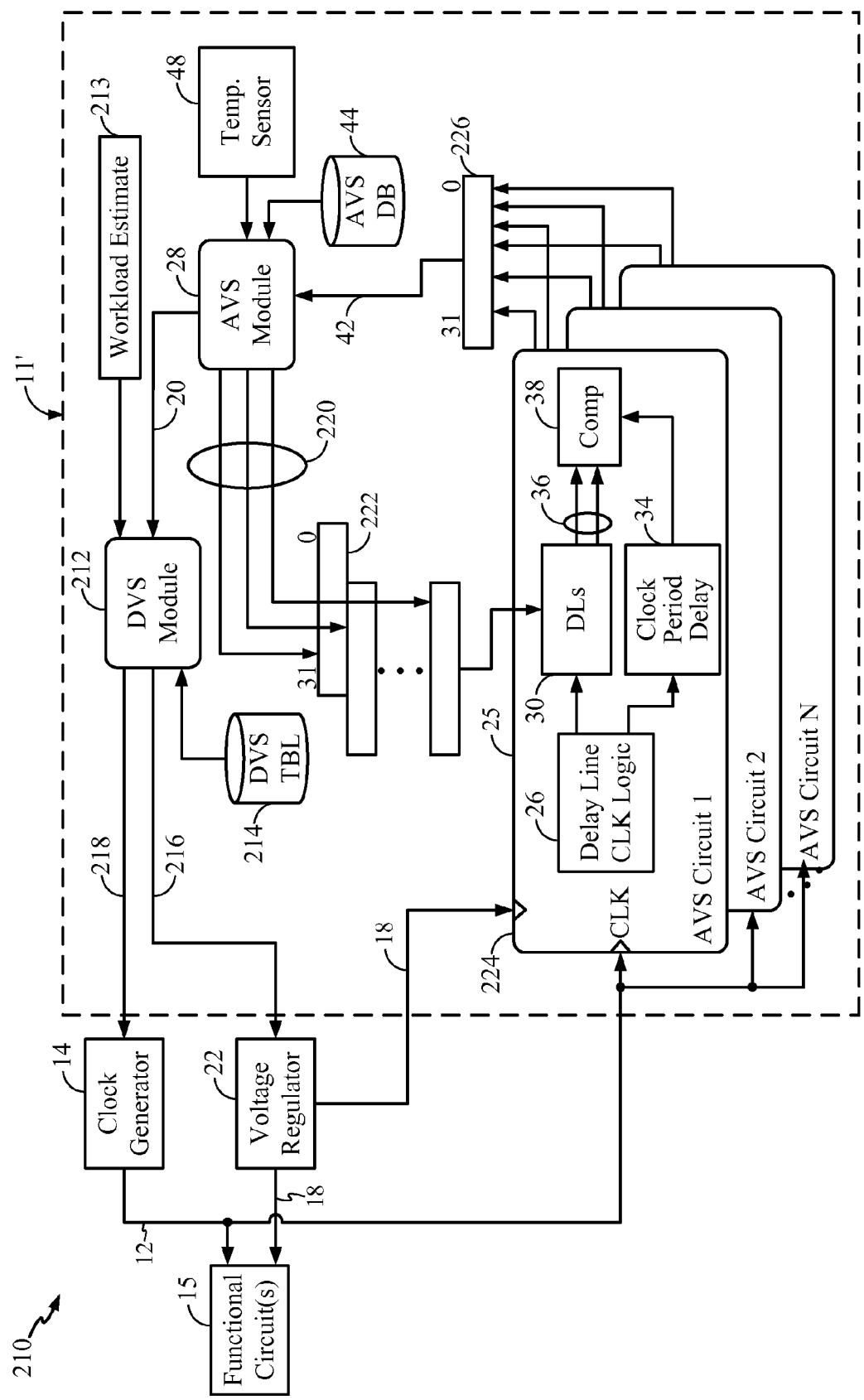
FIG. 18 is a schematic diagram of another exemplary AVS system.

FIG. 18 is another exemplary AVS system 210. The AVS system 210 includes an AVS 11' that is similar to the AVS 11 in FIG. 1. Common components are labeled with common element numbers. The AVS 11' includes the AVS module 28, AVS database 44, delay line clock logic 26, programmable delay lines 30, clock period delay 34, comparators 38, and temperature sensor 48 similar to the AVS 11 of FIG. 1. The AVS operation to set the minimum voltage level can operate according to any of the previously described embodiments. However, the AVS 11' in FIG. 20 also includes a dynamic voltage scaler (DVS) module 212 and DVS table 214. The AVS 11' in FIG. 20 may have been an altered or updated design where the AVS module 28 and AVS database 44 were added to a system already including the DVS module 212 and DVS table 214. The DVS module 212 performs dynamic voltage scaling by communicating a voltage level setting signal 216 to the voltage regulator 22 according to a workload estimate 213 for the functional circuit(s) 15. However, in this embodiment, the AVS module 28 is also provided to adaptively scale the voltage level based on delay variation conditions in the functional circuit(s) 15. The AVS module 28 provides a determined AVS voltage level or voltage level adjustment to the DVS module 212 in response to an indication by the DVS module 212 to the AVS module 28. The AVS module 28 consults the AVS database 44 based on a current and target operating frequency provided from the DVS module 212 to the AVS module 28. The DVS module 212 is configured to set the voltage level setting signal 20 based on the voltage level stored in the DVS table 214 containing voltage levels corresponding to operating frequencies as further adjusted by a voltage level or margin provided from the AVS module 28 back to the DVS module 212. The DVS module 212 also generates an operating frequency setting signal 218 to set the operating frequency of the clock signal 12 generated by the clock generator 14 to control the switching of the functional circuit(s) 15.

The voltage level determined by the AVS module 28 should ideally be the same or lower than the voltage level determined by the DVS module 212 since the AVS module 28 is configured to adaptively further avoid or reduce voltage margin. The AVS module 28 can set the delay in the delay lines (DLs) 30 of the delay circuit 25 via a delay line setting signal 220 as illustrated in FIG. 18 to find the invalid region of operation of the functional circuit(s) 15, as previously described. In this embodiment, the delay line setting signal 220 is a 32-bit delay register 222 that controls the amount of delay. The delay settings may or may not be linear. The delay line setting signal 220 with the value of the 32-bit delay register 222 is communicated to the delay lines 30, as previously discussed, in a plurality of AVSs 224 1-N, which may be circuits. A plurality of delay registers 222 may be provided, each controlling the amount of delay in a given AVS 224. Although not shown, each AVS 224 includes delay line clock logic 26, delay lines 30, comparators 38, and clock period delay 34 similar to that provided in the AVS 11 of FIG. 1. The AVSs 224 include delay logic to simulate the delay in various types of circuits included in the functional circuit(s) 15. Any number of AVSs 224 desired can be provided. The operating frequency of the logic in the AVS 224 and power are also provided from the clock signal 12 and voltage signal 18 generated by the clock generator 14 and voltage regulator 22, respectively. The comparators 38 provide timing margin information in another 32-bit delay register 226 to be communicated over the delay output signal 42 to provide timing margin information to the AVS module 28. The timing information is used to determine the next operating frequency and voltage level as previously described.

The AVS systems and AVSs and related methods described herein may be provided in discrete hardware, or both in hardware and software components. The AVS systems and AVSs and related methods described herein may be used to set an operating frequency and voltage level for any circuit or system, including but not limited to a synchronous digital circuit, central processing unit (CPU) system, and a memory circuit or system. If employed in a memory circuit or system, the memory circuit or system may employ any type of memory. Examples include, without limitation, static random access memory (RAM) (SRAM), dynamic RAM (DRAM), synchronous DRAM (SDRAM), data-double-rate (DDR) SDRAM, data-double-rate-two (DDR2) SDRAM, data-double-rate-three (DDR3) SDRAM, Mobile DDR (MDDR) SDRAM, low-power (LP) DDR SDRAM, and LP DDR2 SDRAM. Any of the components of a memory circuit or system whose operating frequency and voltage level are controlled by the AVSs can be in any voltage domain among a plurality of voltage domains as long as the memory is powered by a voltage domain providing a sufficient voltage level to keep the memory cell functional, if required by the technology and/or design of the memory.

The AVS systems and AVSs according to the designs and methods discussed herein may be included or integrated in a semiconductor die, integrated circuit, and/or device, including an electronic device and/or processor-based device or system. Examples of such devices include, without limitation, a set top box, an entertainment unit, a navigation device, a communications device, a personal digital assistant (PDA), a fixed location data unit, a mobile location data unit, a mobile phone, a cellular phone, a computer, a portable computer, a desktop computer, a monitor, a computer monitor, a television, a tuner, a radio, a satellite radio, a music player, a digital music player, a portable music player, a video player, a digital video player, a digital video disc (DVD) player, and a portable digital video player.

FIG. 19 illustrates a processor-based system 230 that may employ an AVS 232 and related circuits described above. The processor-based system 230 may be included in an electronic device 234. The AVS 232 may be included in a CPU 236 to control an operating frequency of a clock signal and voltage level of a voltage signal provided to a processor(s) 238 in the CPU 236. The CPU 236 is coupled to a system bus 240, which interconnects the other devices included in the processor-based system 230. An AVS 241 may also be included in a graphic processor unit (GPU) 243 coupled to the system bus 240. As is well known, the CPU 236 and/or GPU 243 can communicate with these other devices by exchanging address, control, and data information over the system bus 240. These devices may include any types of devices. As illustrated in FIG. 21, these devices may include system memory 242, one or more input devices 244, one or more output devices 246, a network interface device 248, and a display controller 250, as examples.

The one or more input devices 244 may include any type of input device, including but not limited to input keys, switches, voice processors, etc. The one or more output devices 246 may include any type of output device, including but not limited to audio, video, other visual indicators, etc. The network interface device 248 may be any device configured to allow exchange of data to and from a network 252. The network 252 may be any type of network, including but not limited to a wired or wireless network, private or public network, a local area network (LAN), a wide local area network (WLAN), and the Internet. The network interface device 248 may support any type of communication protocol desired.

The CPU 236 may also access the system memory 242 over the system bus 240. The system memory 242 may include static memory and/or dynamic memory. The system memory 242 may include a program store 254 and a data store 256 for the CPU 236. The CPU 236 may also access the display controller 250 over the system bus 240 to control information sent to a display 258. The display controller 250 may include a memory controller 260 and memory 262 to store data to be sent to the display 258 in response to communications with the CPU 236. The display controller 250 communicates the display information to the display 258 via a video processor 264, which processes the information to be displayed into a format suitable for the display 258. The display 258 may include any type of display, including but not limited to a cathode ray tube (CRT), a liquid crystal display (LCD), a plasma display, etc.

Those of skill in the art would further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope herein.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in memory, and may reside, for example, in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of computer readable medium known in the art. An exemplary storage medium is coupled to the processor such that a processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. An adaptive voltage scaler (AVS), comprising:
   at least one delay circuit configured to receive an input signal and delay the input signal by a delay amount relating to at least one delay path of a functional circuit to produce a delay output signal; and
   an AVS module responsive to the delay output signal and coupled to a database configured to store a plurality of voltage levels and corresponding combinations of an operating frequency for the functional circuit and a temperature level for the functional circuit;
   wherein the AVS module is configured to generate a voltage level setting signal based on delay information in the delay output signal, and further based on one of the plurality of voltage levels stored in the database corresponding to a target operating frequency for the functional circuit and a temperature level of the functional circuit, responsive to the delay output signal.

2. The AVS of claim 1, wherein the AVS module is further configured to generate the voltage level setting signal in response to a received indication that the target operating frequency for the functional circuit should be changed.

3. The AVS of claim 1, wherein the AVS module is further configured to generate the voltage level setting signal in response to a temperature level change.

4. The AVS of claim 3, wherein the AVS module is further configured to determine the temperature level change by receiving a temperature level signal from at least one temperature sensor.

5. The AVS of claim 3, wherein the temperature level change is selected from the group consisting of a change in a current temperature level from a previous temperature level by a threshold value, and a percentage of change of the current temperature level from the previous temperature level.

6. The AVS of claim 1, wherein the AVS module is further configured to store a plurality of learned voltage levels in the database based on the delay information in the delay output signal 7. The AVS of claim 1, wherein the AVS module is further configured to store a plurality of learned voltage levels in the database based on a combination of an operating frequency of the functional circuit and an operating temperature of the functional circuit.

8. The AVS of claim 1, wherein the AVS. module is configured to receive the temperature level of the functional circuit from a temperature sensor.

9. The AVS of claim 1, wherein each voltage level among the plurality of voltage levels corresponds to a combination of one of a plurality of operating frequencies of the functional circuit and one of a plurality of temperature levels producible by at least one temperature sensor.

10. The AVS of claim 1, wherein the AVS module is configured to generate the voltage level setting signal based on a highest voltage level stored in the database associated with the target operating frequency for the functional circuit.

11. The AVS of claim 1, wherein the database is further configured. to store a plurality of temperature level bands for each operating frequency stored in the database.

12. The AVS of claim 11, wherein the AVS module is further configured to adjust temperature levels defining the plurality of temperature level bands stored in the database.

13. The ANTS of claim 12, wherein the AVS module is configured to adjust the temperature levels defining the plurality of temperature level bands stored in the database based on learned voltage levels for the functional circuit.

14. The AVS of claim 1, wherein the ANTS module is at least partially controllable by software, 15. The AVS of claim 1 integrated in at least one semiconductor die.

16. The AVS of claim 1, further comprising a device selected from the group consisting of a set top box, an entertainment unit, a navigation device, a communications device, a personal digital assistant (PDA), a fixed location data unit, a mobile location data unit, a mobile phone, a cellular phone, a computer, a portable computer, a desktop computer, a monitor, a computer monitor, a television, a tuner, a radio, a satellite radio, a music player, a digital music player, a portable music player, a video player, a digital video player, a digital video disc (DVD) player, and a portable digital video player, into which the AVS is integrated.

17. The AVS of claim 1, wherein the AVS module is further configured to generate the voltage level setting signal based on a voltage offset added to the one of the plurality of voltage levels.

18. A method of scaling a voltage level for a functional circuit, comprising:

receiving an input signal in at least one delay circuit;
delaying the input signal by a delay amount relating to at least one delay path of a functional circuit to produce a delay output signal; and
generating a voltage level setting signal based on delay information in the delay output signal, and further based on a voltage level stored in a database and corresponding to a combination of an operating frequency for the functional circuit and a temperature level of the functional circuit stored in the database.

19. The method of claim 18, further comprising receiving an indication that the operating frequency for the functional circuit should be changed, wherein the voltage level setting signal is generated in response to the received indication.

20. The method of claim 18, wherein the voltage level setting signal is generated in response to a temperature level signal from at least one temperature sensor.

21. The method of claim 18, further comprising storing a plurality of learned voltage levels in the database based on the delay information in the delay output signal.

22. The method of claim 18, further comprising receiving a temperature level of the functional circuit from at least one temperature sensor.

23. The method of claim 18, further comprising storing in the database a plurality of voltage levels and corresponding combinations of an operating frequency for the functional circuit and a temperature level of the functional circuit.

24. The method of claim 18, further comprising storing in the database a plurality of voltage levels and corresponding combinations of one of a plurality of operating frequencies of the functional circuit and one of a plurality of temperature levels producible by at least one temperature sensor.

25. The method of claim 18, wherein generating the voltage level setting signal comprises generating the voltage level setting signal based on a highest voltage level stored in the database associated with the operating frequency for the functional circuit.

26. The method of claim 18, further comprising storing a plurality of temperature level bands for each operating frequency in the database.

27. The method of claim 26, further comprising adjusting temperature levels defining the plurality of temperature level bands stored in the database.

28. The method of claim 27, further comprising adjusting the temperature levels defining the plurality of temperature level bands stored in the database based on learned voltage levels for the functional circuit.

29. The method of claim 18, further comprising generating the voltage level setting signal based on a voltage offset added to the voltage level.

30. A circuit, comprising:
a functional circuit; and
an adaptive voltage scaler (AVS) coupled to the functional circuit, comprising:
at least one delay circuit configured to receive an input signal and delay the input signal by a delay amount relating to at least one delay path of the functional circuit to produce a delay output signal; and
an AVS module responsive to the delay output signal and coupled to a database configured to store a plurality of voltage levels and corresponding combinations of an operating frequency for the functional circuit and a temperature level for the functional circuit:
wherein the AVS module is configured to generate a voltage level setting signal based on delay information in the delay output signal, and further based on one of the plurality of voltage levels stored in the database corresponding to a target operating frequency for the functional circuit and a temperature level of the functional, responsive to the delay output signal.

31. The circuit of claim 30, wherein the AVS module is further configured to generate the voltage level setting signal based on a voltage offset added to the one of the plurality of voltage levels.

32. A non-transitory computer readable medium having stored thereon computer executable instructions to cause an adaptive voltage scaler (AVS) module to generate a voltage level setting signal based on delay information in a delay output signal representing a delay amount relating to at least one delay path of a functional circuit, and further based on a voltage level stored in a database and corresponding to a combination of an operating frequency for the functional circuit and a temperature level of the functional circuit stored in the database.

33. The non-transitory computer readable medium of claim 32 having stored thereon the computer executable instructions to further cause the AVS module to generate the voltage level setting signal based on a voltage offset added to the voltage level.

34. An adaptive voltage scaler (AVS), comprising:
a delay means for receiving an input signal and delaying the input signal by a delay amount relating to at least one delay path of a functional circuit for producing a delay output signal; and
an AVS means responsive to the delay output signal and coupled to a database configured to store a plurality of voltage levels and corresponding combinations of an operating frequency for the functional circuit and a temperature level for the functional circuit, for generating a voltage level setting signal based on delay information in the delay output signal, and further based on one of the plurality of voltage levels stored in the database corresponding to a target operating frequency for the functional circuit and a temperature level of the functional circuit.

* * * * *